(12) United States Patent
Ito et al.

(10) Patent No.: US 7,171,645 B2
(45) Date of Patent: Jan. 30, 2007

(54) SEMICONDUCTOR DEVICE, METHOD OF GENERATING PATTERN FOR SEMICONDUCTOR DEVICE, METHOD OF MANUFACTURING SEMICONDUCTOR DEVICE AND DEVICE OF GENERATING PATTERN USED FOR SEMICONDUCTOR DEVICE

(75) Inventors: Mitsumi Ito, Nagaokakyo (JP); Junichi Shimada, Osaka (JP); Kiyohito Mukai, Takatsuki (JP); Hiroyuki Tsujikawa, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 10/634,988

(22) Filed: Aug. 6, 2003

(65) Prior Publication Data

US 2004/0139412 A1 Jul. 15, 2004

(30) Foreign Application Priority Data

Aug. 6, 2002 (JP) ............... P. 2002-229215

(51) Int. Cl.
*G06F 17/50* (2006.01)
(52) U.S. Cl. .................... 716/19; 716/10
(58) Field of Classification Search .......... 716/2, 716/7–10, 19
See application file for complete search history.

(56) References Cited

U.S. PATENT DOCUMENTS

| | | | | |
|---|---|---|---|---|
| 5,923,563 A | | 7/1999 | Lavin et al. | |
| 6,567,964 B2 * | | 5/2003 | Shin et al. | 716/8 |
| 6,748,574 B2 * | | 6/2004 | Sasagawa et al. | 716/9 |
| 6,782,512 B2 * | | 8/2004 | Asakawa | 716/1 |
| 2002/0001885 A1 * | | 1/2002 | Noble | 438/149 |
| 2002/0073391 A1 * | | 6/2002 | Yamauchi et al. | 716/8 |
| 2002/0116686 A1 * | | 8/2002 | Shin et al. | 716/2 |
| 2002/0157076 A1 * | | 10/2002 | Asakawa | 716/10 |
| 2002/0184606 A1 * | | 12/2002 | Ohba et al. | 716/11 |
| 2003/0196181 A1 * | | 10/2003 | Sano et al. | 716/4 |
| 2003/0229875 A1 * | | 12/2003 | Smith et al. | 716/10 |

OTHER PUBLICATIONS

Chen, Yu et al., "Monte-Carlo algorithms for layout density control", Jan. 2000, IEEE, pp. 523-528.*
Kahng, A.B. et al., "New and exact filling algorithms for layout density control", Jan. 1999, IEEE, pp. 106-110.*
Kahng, A.B. et al., "Filling algorithms and analyses for layout density control", Apr. 1999, IEEE, pp. 445-462.*
Lee, Brian et al., "Using Smart dummy fill and selective reverse etchback for pattern density equalization", IEEE, pp. 1-4, Mar. 2000.*

* cited by examiner

*Primary Examiner*—Stacy A Whitmore
(74) *Attorney, Agent, or Firm*—McDermott Will & Emery LLP

(57) ABSTRACT

To provide a pattern generating method for a semiconductor device capable of forming a highly reliable semiconductor device, the accuracy of which is high.

A method of generating a pattern for a semiconductor device comprises: a step of designing and arranging a layout pattern of a semiconductor chip; a step of extracting an area ratio of the mask pattern from the layout pattern; and a step of adding and arranging a dummy pattern to the layout pattern, while consideration is given to the most appropriate area ratio of the layout pattern of the layer obtained according to a process condition of the layer composing the layout pattern, so that the area ratio of the layer can be the most appropriate area ratio.

18 Claims, 22 Drawing Sheets

MOST APPROPRIATE AREA RATIO

IN THE CASE WHERE AREA RATIO LACKS, REPLACE DUMMY CELL WITH ONE OF HIGH DENSITY

LACK OF AREA RATIO (4,6,8)  (5,7,9)

(4,6,8)  (5,7,9)

SEMICONDUCTOR DEVICE, METHOD OF GENERATING PATTERN FOR SEMICONDUCTOR DEVICE, METHOD OF MANUFACTURING SEMICONDUCTOR DEVICE AND DEVICE OF GENERATING PATTERN USED FOR SEMICONDUCTOR DEVICE

BACKGROUND OF THE INVENTION

1. Field of the Invention

The present invention relates to a semiconductor device, a method of generating a semiconductor device, a method of manufacturing a semiconductor device and a device for generating a semiconductor device. More particularly, the present invention relates to a generation of a pattern used for a semiconductor device capable of generating a highly accurate pattern according to a process condition of the semiconductor device and also capable of flattening a surface of the pattern.

2. Description of Related Art

Recently, semiconductor devices, especially, large-scale integrated circuits (LSI) have been increasingly made fine and the grade of integration has been enhanced. Accordingly, there is a strong and growing demand for forming a fine and complicated pattern. In these circumstances, in order to form a pattern in accordance with the design, the process condition is increasingly restricted. In the case of forming a semiconductor device, a surface of a semiconductor substrate is subjected to isolation and at the same time a well of a predetermined density is formed, and a desired conductive type impurity diffusion region is formed in the well. Further, an insulating film and a wiring pattern are formed.

For example, the wiring pattern is formed as follows. After a conductive layer such as a polycrystalline silicon layer, an aluminum layer and a metallic silicide layer has been formed, a desired mask pattern is formed by photolithography, and etching is conducted while this mask pattern is used as a mask. In this way, the wiring pattern can be formed.

In the etching process, a conductive film exposed from the mask pattern is selectively removed. However, even when the concentration and temperature of the etchant are optimized, the etching speed fluctuates by the influence of the pattern density (area ratio) and the peripheral length of the mask pattern. Therefore, according to the density or the pattern pitch of the mask pattern, the etching accuracy becomes different. Accordingly, the etching accuracy deteriorates even when the mask pattern region is too large or too small.

In the case of forming the diffusion layer, the same problems may be encountered. When a region into which ions are injected is too small in the case of forming the diffusion layer, ions are concentrated, and it is impossible to obtain a predetermined diffusion profile.

A method of CMP (Chemical Mechanical Etching) is proposed for flattening a substrate surface. According to this method, after an insulating film has been formed on the surface, for example, by the coating method or CVD method, chemical etching is conducted while mechanically polishing, so that the surface can be flattened. However, in the case where the pattern density of the lower wiring layer is small, when a region, in which a pattern of not less than a predetermined area does not exist, is existing, even if a thick insulating layer is formed, it is impossible to flatten the surface. As a result, even after CMP has been conducted, a recess portion in which no wiring pattern exists is formed, that is, the surface is left being recessed.

In the case where the layout pattern is biased as described above, the following problems may be encountered. Not only it is impossible to obtain sufficiently high pattern accuracy with respect to the layer concerned but also the pattern accuracy of an upper layer of the layer concerned is affected. Therefore, it is impossible to obtain sufficiently high process accuracy.

In the above circumstances, LSI is positioned as a key device of each product. In order to enhance the competitiveness of products, there is a demand of increasing the scale and the processing speed of LSI. Since the product cycle has been recently shortened, in order to meet the demand, it indispensable to automatically conduct to design LSI.

SUMMARY OF THE INVENTION

The present invention has been accomplished in view of the above actual circumstances. It is an object of the present invention to provide a method of generating a pattern used for a semiconductor device capable of forming a highly accurate, reliable semiconductor device.

Therefore, the present invention provides a method of generating a pattern for a semiconductor device comprising: a step of designing and arranging a layout pattern of a semiconductor chip; a step of extracting an area ratio of the layout pattern; and a step of adding and arranging a dummy pattern to the layout pattern, while consideration is given to the most appropriate area ratio of the pattern of the layer obtained according to a process condition of the layer composing the layout pattern, so that an area ratio of the layer can be the most appropriate area ratio, wherein the area ratio of the layer concerned becomes the most appropriate area ratio.

According to this method, the following advantages can be provided. When a dummy pattern is formed even in a region in which a pattern is not required from the viewpoint of the function of a circuit while consideration is being given to the process condition, it is possible to prevent the concentration of etching seeds and injection ions. The dummy pattern is a pattern formed additionally in order to obtain a most appropriate area ratio. Further, it is possible to prevent the occurrence of flatness from a viewpoint of a macro-dimension. Therefore, the pattern accuracy can be enhanced, the impurity profile of a diffusion layer can be optimized, and the surface can be flattened. In this case, an adjustment is made so that the area ratio can be overlapped with the most appropriate one. In this adjustment, it is important that the adjustment is made to attain a target value of the target area ratio close to the most appropriate area ratio while consideration is being given to the most appropriate area ratio, which is determined by the process condition, and the various conditions. "The most appropriate area ratio" is a most appropriate ratio of an area occupied with the pattern in the pattern forming area (an entire substrate surface). The most appropriate area ratio is often not only a point, but also can be in a range between a value and another value. In such a case, a center point in the range of area ratio is preferably defined as the most appropriate area ratio. For example, in the case that an appropriate range is a range between 50% and 70%, 60% is applied as the most appropriate ratio. Because even if the ratio is deviated a little from the most appropriate ratio, in case that the ratio is within the appropriate range in almost all cases, and as a result, a formation of an accurate pattern can be performed. Further, a point nearly to a designed ratio in the range of area ratio wherein accurate pattern can be obtained in the process condition, can be selected.

It is preferable that a method of generating a pattern for a semiconductor device further comprises: a step of dividing the layout pattern formed in the layout pattern forming step into small regions of a desired size; a step of extracting an area ratio of a mask pattern for each small region divided; and a step of adding a dummy pattern so that the area ratio can be overlapped with the most appropriate area ratio of the mask pattern corresponding to the layout pattern, wherein the area ratio of each small region is adjusted to be the same.

According to this constitution, when the area ratio is adjusted to be the same for each small region, the area ratio of the entire layer concerned can be made uniform and optimized. When a size and pitch of the dummy pattern to be added for each small region are adjusted, the area ration can be easily optimized. In this case, small region can be a region divided eaqually. And region can be divided according to the function.

It is preferable that a method of generating a pattern for a semiconductor device further comprises: a step of preparing a plurality of types of dummy pattern cells, the area ratios of which are different from each other, and the dummy pattern adding step including a step of selecting a desired dummy pattern cell from the dummy pattern cells according to the area ratio of the small region According to the above constitution, when the most appropriate dummy pattern cell is selected from the dummy pattern cells, the area ratios of which are different, the area ratio can be easily adjusted to be the same. Therefore, the area ratio of the entire layer concerned can be optimized. When addition dummy patterns, the sizes and pitches of which are different for each small region, are prepared in the plurality of dummy pattern cells, the most appropriate dummy pattern cells can be easily selected. "The dummy pattern cell" shows a unit of aggregation of the dummy patterns.

It is preferable that an area ratio after the completion of forming the dummy pattern is calculated, it is judged whether or not the area ratio is in a range of a predetermined condition, and when the area ratio is not in the range of the predetermined condition, several of the dummy patterns are replaced and the most appropriate dummy pattern cell is selected.

It is preferable that the layout pattern forming step includes a step of forming a mask pattern for forming a wiring layer.

It is preferable that the layout pattern forming step includes a step of forming a mask pattern for forming a diffusion layer.

It is preferable that the layout pattern forming step includes a step of forming a mask pattern for forming a gate electrode.

It is preferable that the layout pattern forming step includes a step of forming a mask pattern for forming a well.

It is preferable that a method of generating a pattern for a semiconductor device further comprises a step of adjusting a layout in the vertical direction so that the dummy pattern cell can compose an MOS capacitor cell.

According to the above constitution, when the layout in the vertical direction is adjusted, it is possible to obtain a region in which the conductor pattern is formed via the gate oxide film in the diffusion region. When the diffusion region and the conductor pattern are connected to electric potentials, which are different from each other, such as the ground wiring and power supply wiring, it is possible to use them as a capacitor element. Accordingly, it is possible to form a highly accurate pattern corresponding to the process condition. Further, it becomes possible to insert a decoupling capacitor. Therefore, it becomes possible to automatically take measures to electromagnetic interference.

It is preferable that the MOS capacitor cell is electrically connected to a power supply wiring and a ground wiring by a dummy pattern cell composed of an aggregation of the dummy patterns. Due to the foregoing, it becomes possible to form an MOS capacitor cell without adding a special circuit necessary for forming an electric potential.

It is preferable that the dummy pattern cell has a cross like pattern, and the dummy pattern cells on an upper and a lower layer of the cross like pattern mutually have an island-shaped isolated pattern corresponding to the cross region of the cross like pattern.

Due to the above constitution, when the MOS capacitor cell is connected to a desired electric potential such as the power supply electric potential or the ground electric potential, it is possible to make a connection easily by reducing the wiring length. In order to connect or not to connect putting it in a floating state, the connecting state can be easily controlled by whether or not through-holes are formed on the isolated pattern.

The decoupling capacitor, which has been spread all over right below the electric power supply, can be easily connected to the electric power supply when vias are provided right above the decoupling capacitor. In the case where the electric power supply wiring is an upper layer, if an upper portion of the decoupling capacitor is open, that is, if no signal lines are formed, vias and pads for stacking are automatically formed.

On the other hand, the decoupling capacitor, which is arranged at a position distant from the electric power supply wiring, can be easily connected when the wiring is formed into a cross-shape at the same pitch as that of the capacitor cells.

It is preferable that the dummy pattern cell is composed of a first layer cell having a cross like pattern and an isolated island-shaped pattern in each of the four regions divided by the cross like pattern and also composed of a second layer cell having an isolated island-shaped pattern at the center, the pattern of which is a sharp-mark-shape arranged so that it crosses at four points corresponding to the four island-shaped pattern, located on an upper layer or a lower layer continuing to the first layer cell, and the first layer and the second layer respectively compose an electric power supply wiring and a ground wiring.

Due to the above constitution, the MOS capacitor cell can be connected to a desired electric potential such as the power supply electric potential or the ground electric potential. Alternatively, the MOS capacitor cell can be put into a floating state without being connected. Therefore, it is possible to compose a very simple dummy pattern cell.

For example, in the analog circuit region, the withstanding voltage of which must be high, it is necessary to increase the film thickness of the gate oxide film. On the other hand, in the other logic circuit regions, it is unnecessary to increase the film thickness of the gate oxide film. Accordingly, there is proposed a structure in which the film thickness of the gate oxide film is increased in the analog circuit region, and the film thickness of the gate oxide film is relatively reduced in the other logic circuit regions so that the decoupling capacitor can be increased. However, the problem of gate leakage has been recently brought into a relief. Accordingly, in order to enhance the reliability, there is a tendency that a thick gate oxide film is adopted even in the logic circuit region.

Even in the above circumstances, according to the present invention, the space area is extracted and the decoupling capacitor can be formed as much as possible. Therefore, it is possible to satisfy two functions in a trade-off relation, one is a reduction of the gate leakage and the other is an increase in the decoupling capacitor. In other words, while the gate leakage is being reduced, the decoupling capacitor can be increased.

As described above, it is possible to automatically generate a pattern of the semiconductor device.

The present invention provides a device of generating a pattern used for a semiconductor device comprising: a layout pattern forming means for forming a layout pattern from layout data of a semiconductor chip; a space area detecting means for detecting a space area according to the layout pattern with respect to at least one layer of the layout pattern; a most appropriate area ratio extracting means for extracting the most appropriate area ratio for forming the pattern of the layer according to a design rule; and a dummy pattern arranging means for calculating an area ratio of the layer from the space area detecting means and arranging a dummy pattern so that the area ratio can be the most appropriate one.

The present invention provides a method of manufacturing a semiconductor device comprising: a step of forming a mask pattern of each step according to a pattern for a semiconductor device generated by the above method or the above device; and a step of executing each process by using the mask pattern and forming a semiconductor device.

The present invention provides a semiconductor device comprising a pattern for a semiconductor device generated by the above method or the above device.

It is preferable that the pattern for a semiconductor device has an aggregation of dummy patterns of the same size not to be electrically connected, and at least one of the dummy patterns on each layer includes a region overlapped with a dummy pattern on an upper or a lower layer of the layer concerned in the vertical direction.

When the dummy patterns of the same size are positioned and arranged in the vertical direction so that the most appropriate area ratio can be satisfied, it is possible to automatically form a region having an overlap. Further, when the patterns of the same size are appropriately arranged, the peripheral length can be made to be the same and easily adjusted.

In this case, the function element includes a function element composing LSI such as a transistor, memory, wiring and so forth.

Further according to the present invention, the automatization of generating a pattern easily can be performed so that the generation of noise from a power supply can be positively reduced.

And a much larger capacitor without increasing an occupied area can be formed and as a result the generation of noise from a power supply can be more positively reduced.

DETAILED DESCRIPTION OF THE PREFERRED EMBODIMENTS

Figure 1:
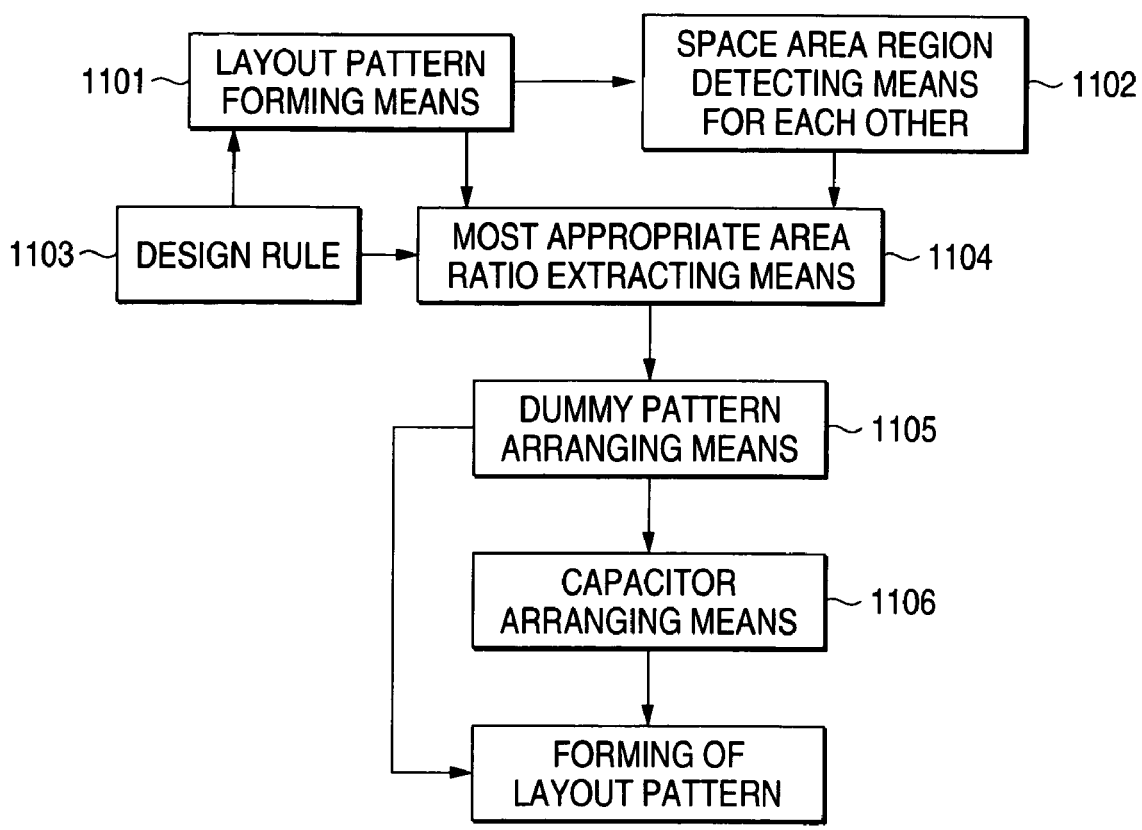
FIG. 1 is a block diagram showing a pattern generating device of the first embodiment of the present invention.

Referring to the drawings, embodiments of the present invention will be explained in detail as follows.

First Embodiment

FIG. 1 is a block diagram showing a pattern generating device of an embodiment of the present invention. In this embodiment, while consideration is being given to the most appropriate area ratio determined by the process condition for each layer, the dummy patterns are arranged and the layout pattern is formed.

As shown in FIG. 1, this device includes; a layout pattern forming means 1101 for forming a layout pattern from the layout data of a semiconductor chip, the development of LSI of which has been completed while consideration is being given to taking measures to electromagnetic interference, and the verification of the layout of which has been completed; a space area detecting means 1102 for detecting a space area for each layer according to the layout pattern; a most appropriate area ratio extracting means 1104 for extracting the most appropriate area ratio for forming each layer pattern according to the design rule 1103; a dummy pattern arranging means 1105 for arranging a dummy pattern so that the area ratio of each layer, which has been calculated from the space area detecting means 1102, can be the most appropriate area ratio; and a capacitor arranging means 1106 for judging whether or not the decoupling capacitor can be added while consideration is being given to a positional relation in the vertical direction between the diffusion region of the dummy pattern and the gate conductor and for connecting the region, in which the decoupling capacitor can be added, with the power supply wiring and the ground wiring, wherein the layout pattern forming means 1101 outputs the layout pattern data optimized according to the process condition.

In this case, the technology calculated by the design rule is defined as follows. Sizes of the cell, bypass capacitor and wiring are defined by the design rule of each process of diffusion, spattering and etching.

Further "the process condition" shows temperature, kind of gases, density of gas, gas pressure and so on applied to the process of diffusion, sputtering, etching and so on.

Figure 2:
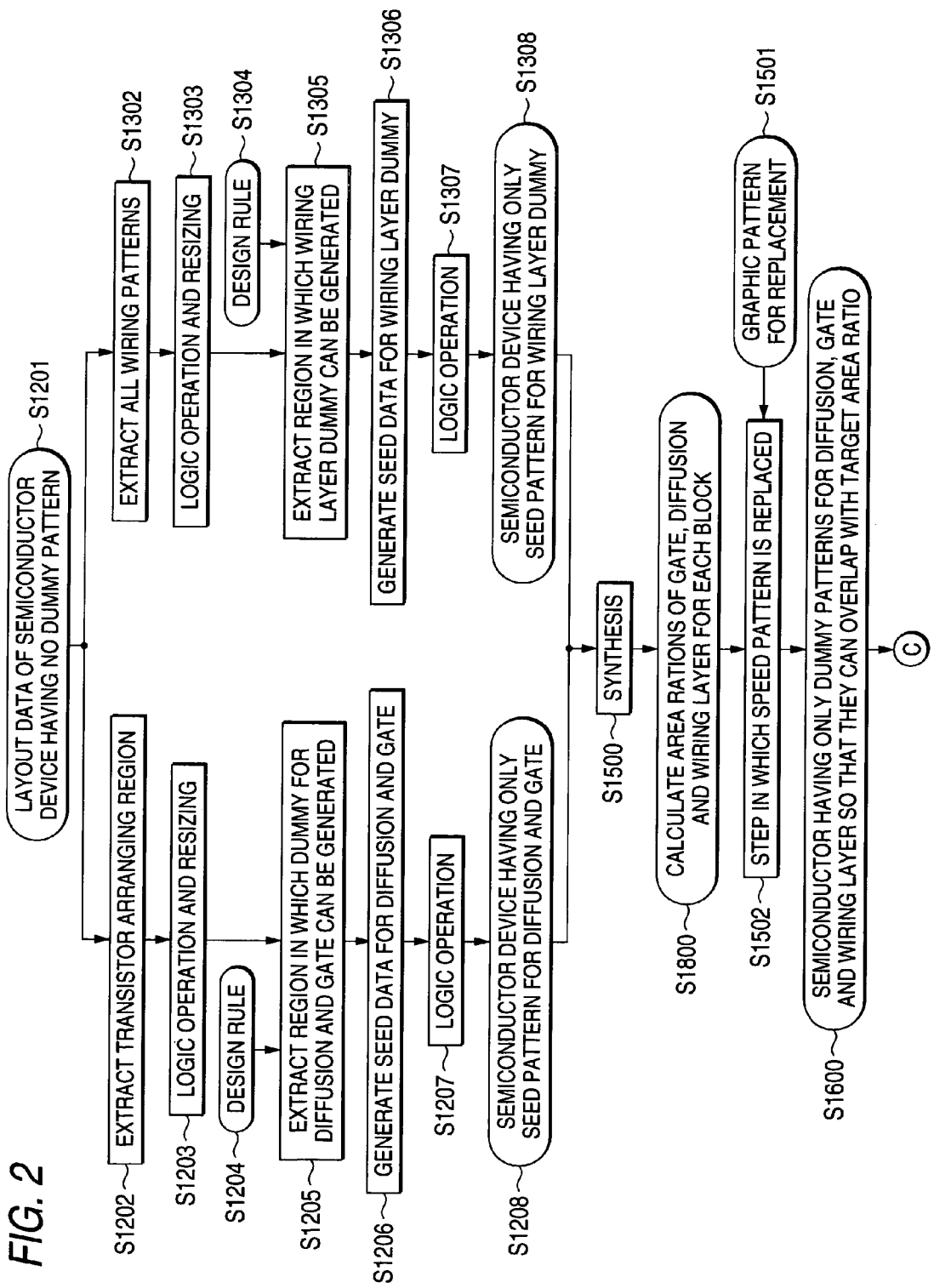
FIG. 2 is a flow chart showing a pattern generating method of the first embodiment of the present invention.
Figure 3:
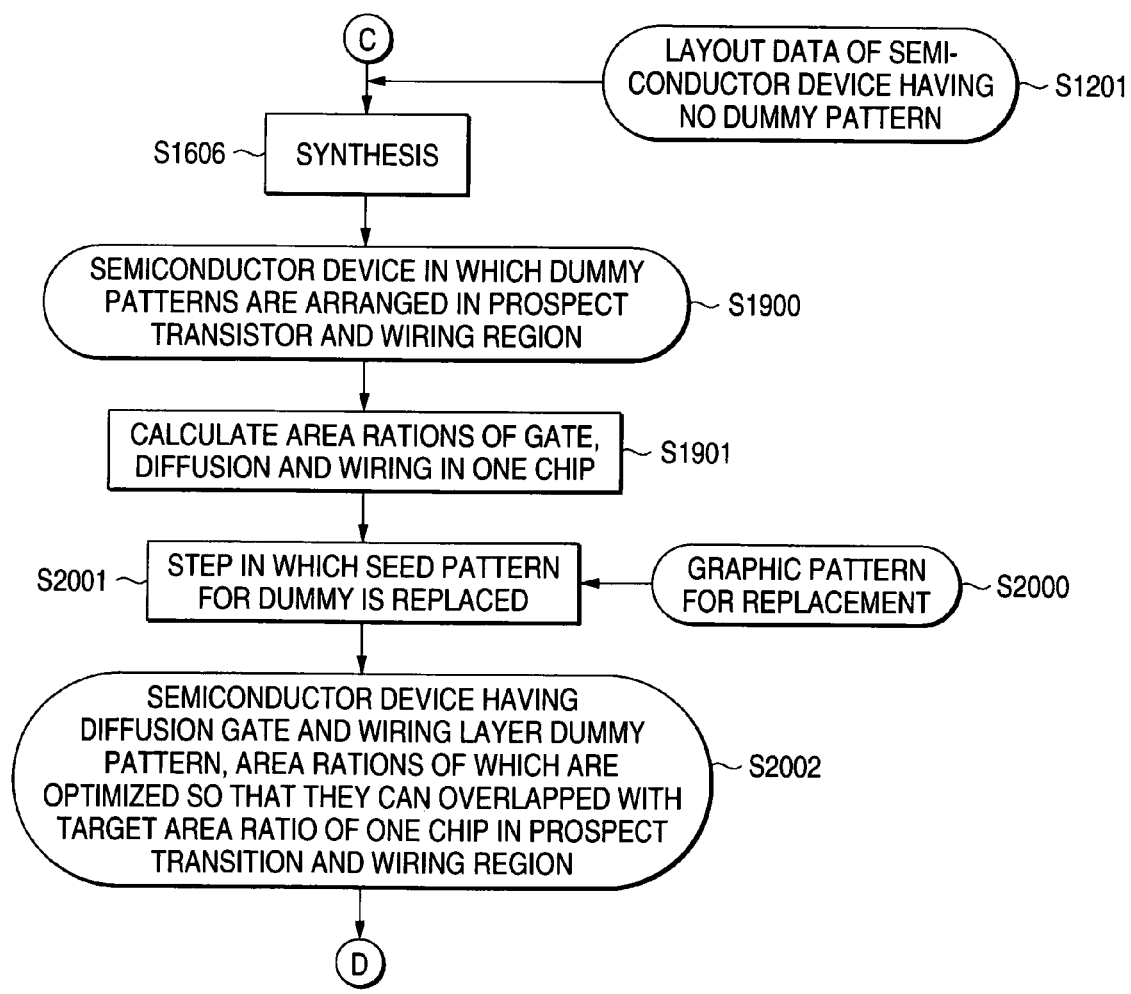
FIG. 3 is a flow chart showing a pattern generating method of the first embodiment of the present invention.

This pattern generating device forms a layout pattern optimized as shown in the flow chart of FIGS. 2 and 3.

Figure 5:
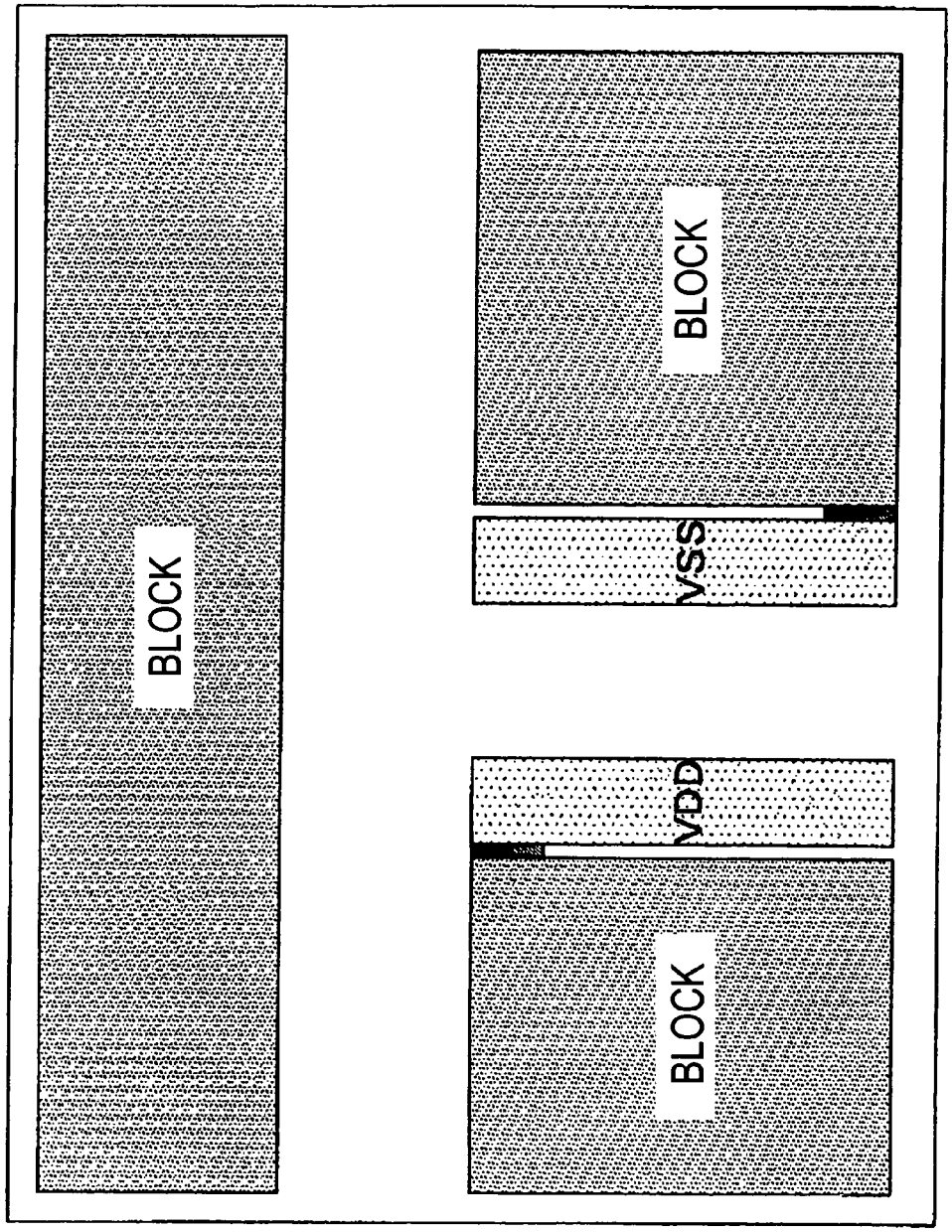
FIG. 5 is a schematic illustration showing a pattern generating process of the first embodiment of the present invention.
Figure 6:
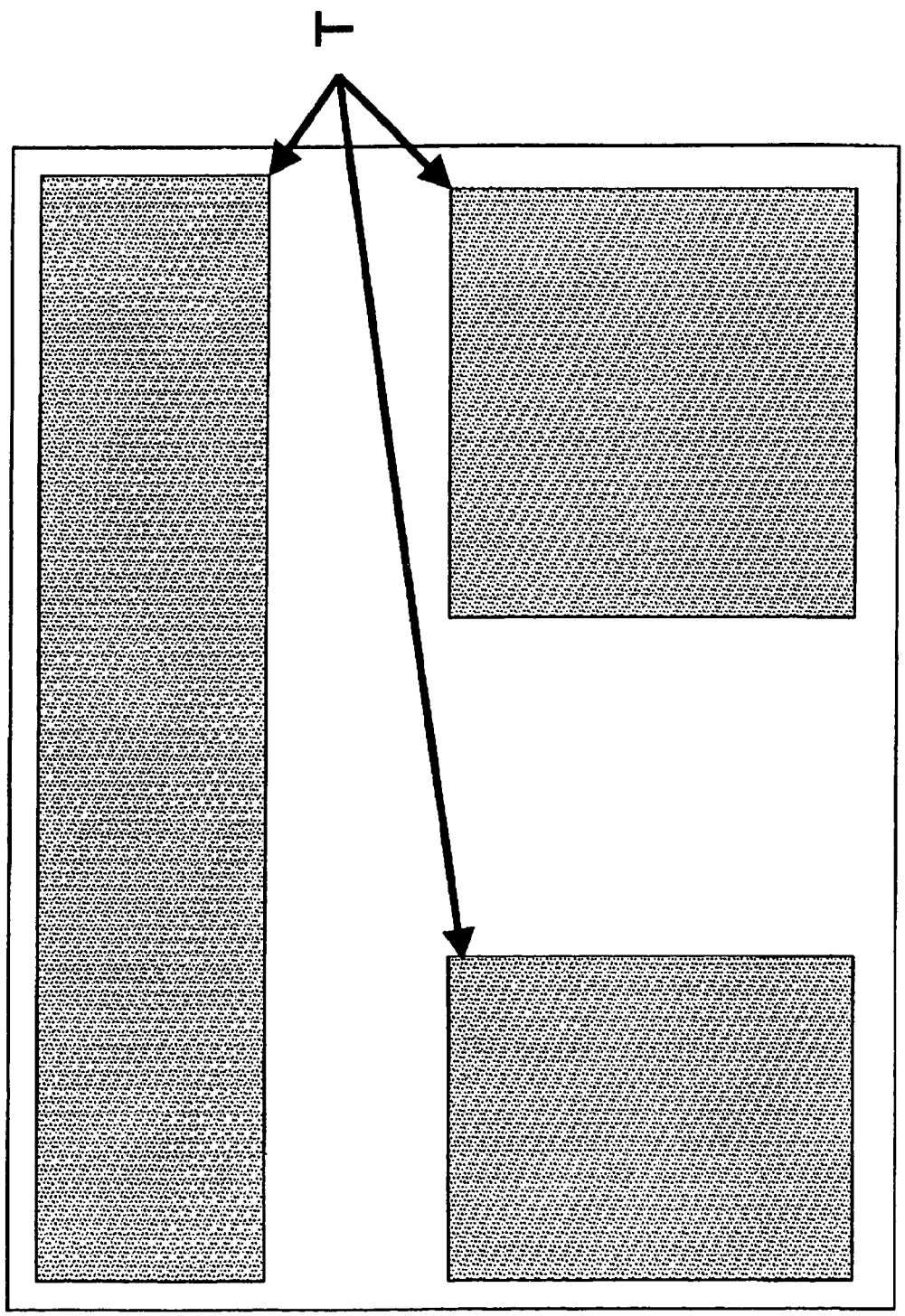
FIG. 6 is a schematic illustration showing a pattern generating process of the first embodiment of the present invention.

From the layout data (shown in FIG. 5) (1201) of a semiconductor chip, the development of LSI of which has been complete while consideration is being given to taking measures to electromagnetic interference, and the verification of the layout of which has been completed, the transistor arranging region T is extracted (shown in FIG. 6) (step 1202). In this case, while a left lower position and a right upper position of the semiconductor chip are positioned all over the steps, the layout data is generated by the reference to the two points concerned.

Figure 7:
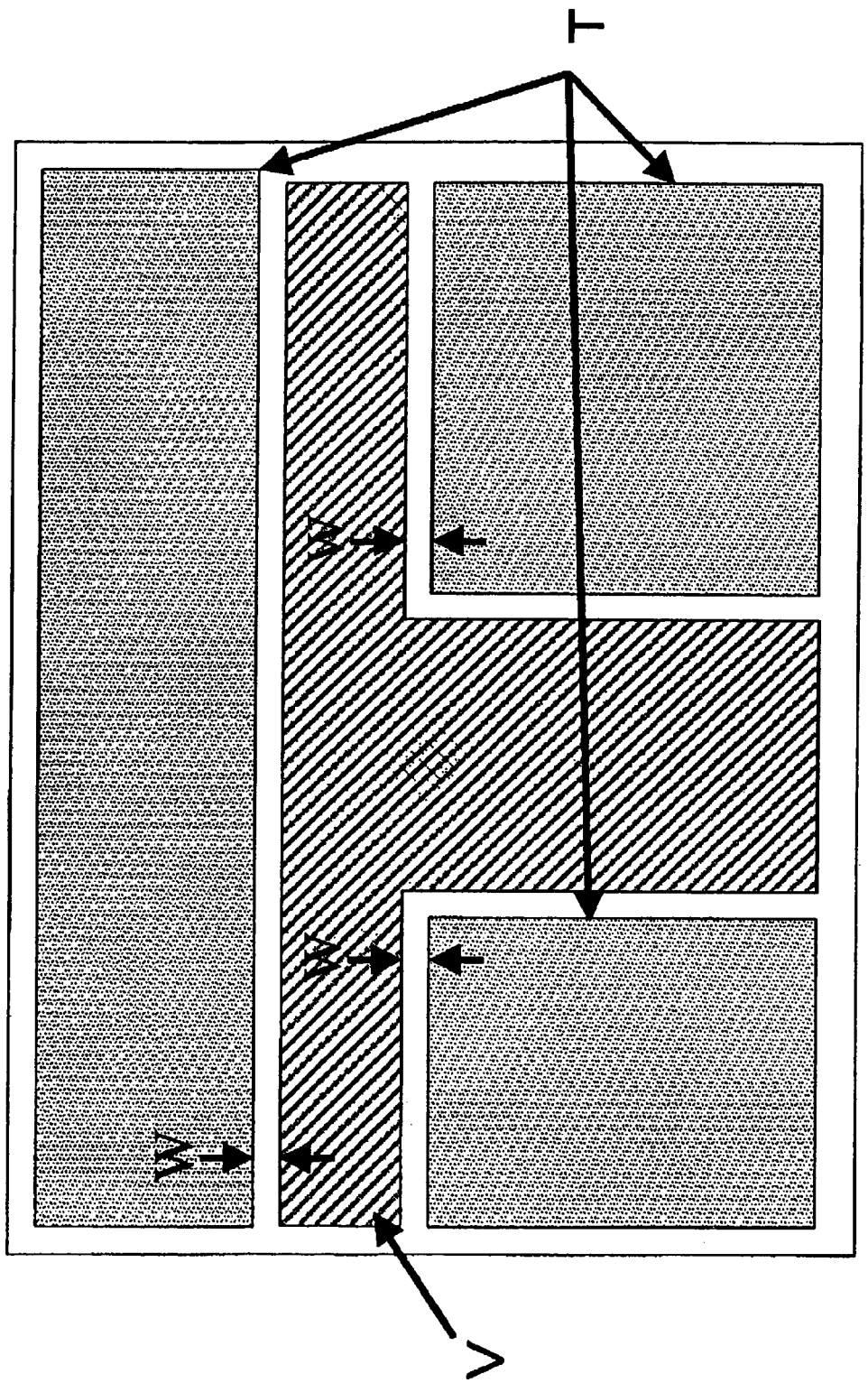
FIG. 7 is a schematic illustration showing a pattern generating process of the first embodiment of the present invention.

When the transistor arranging region T and the semiconductor chip region are subjected to a logic operation and inverted, a region in which no transistor is arranged in the semiconductor chip is extracted, and a resizing step is executed in which the size of this region is reduced by a predetermined width W (logic operation step S1203). By this inversion, the region in which no transistor is arranged is obtained. When the size of this region is reduced by resizing, the space area V in which the dummy pattern cell can be formed is obtained as shown in FIG. 7.

Further, according to the design rule (S1204), while consideration is being given to the distance between the adjacent patterns capable of being formed, the region in which the dummy pattern can be formed is extracted (step S1205). In this case, step S1205 is executed for each layer of the diffusion layer and the gate conductor.

After that, the seed data for the dummy pattern for forming the diffusion region and the seed data for the dummy pattern for forming the gate conductor are generated (step S1206).

Figure 8:
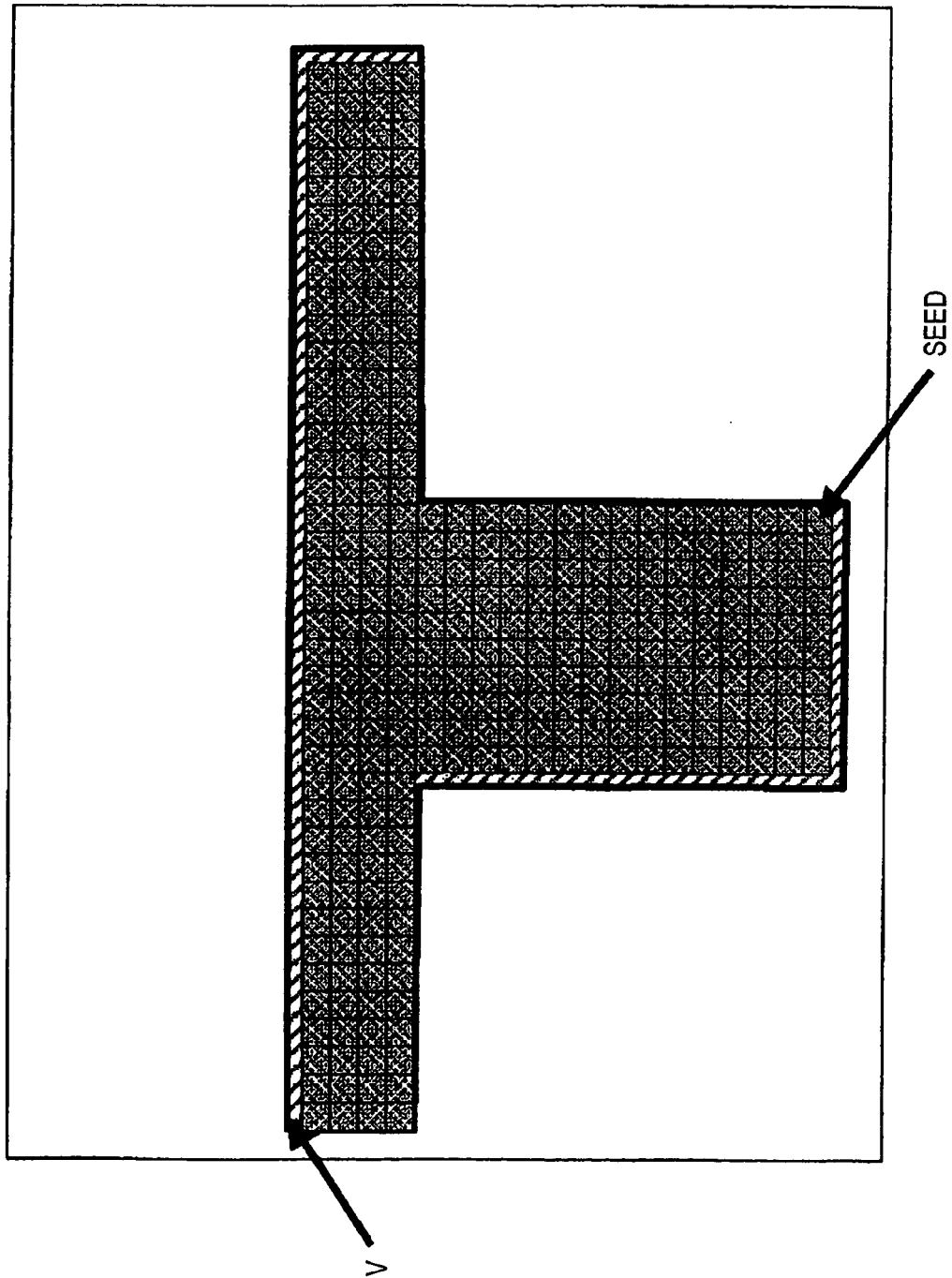
FIG. 8 is a schematic illustration showing a pattern generating process of the first embodiment of the present invention.

With respect to each layer, each of the seed data for the dummy pattern for forming the diffusion region and the seed data for the dummy pattern for forming the gate conductor, and the region in which the dummy pattern can be formed are subjected to a logic operation (step S1207). In this way as shown in FIG. 8, a semiconductor device is obtained which is composed of only the seed pattern for the dummy pattern for forming the diffusion region and the seed pattern for the dummy pattern data coupling capacitor for forming the gate conductor.

On the other hand, from the layout data (1201) of the semiconductor chip, all wiring patterns are extracted (step 1302).

When this wiring pattern arranging region and the semiconductor chip region are subjected to a logic operation and inverted, the region in which no conductor chip is arranged on the semiconductor chip is extracted, and this region is resized so that the size can be reduced by a predetermined width W (logic operation step 1303). By this inversion, it is possible to obtain a region in which no wiring is arranged. When the size of this region is reduced by resizing, it is possible to obtain a space area in which the wiring dummy pattern cell can be formed.

Further, while consideration is being given to a distance between the adjacent patterns capable of being formed according to the design rule (1304), a region in which the dummy wiring can be formed is extracted (step 1305).

After that, the seed data for the dummy wiring is generated (step 1306).

Then, this seed data for dummy wiring and the space area VC in which the wiring layer dummy pattern cell can be formed are subjected to a logic operation (step 1307). In this way, a semiconductor device composed of only the seed pattern for the wiring layer dummy is obtained (step 1308).

The thus obtained seed pattern for wiring layer dummy is synthesized with the seed data for dummy pattern for forming the diffusion region and the seed data for forming the gate conductor (step 1500), and synthesis is conducted on the gate conductor, diffusion region and wiring for each block (small region). Then, the area ratio is extracted for each block with respect to each layer (step 1800). A plurality of graphic patterns for replacement are prepared (step 1501). In the case of a region which extends to the boundary so that the region can not be formed, the pattern is replaced with a small seed pattern. In the case of a region capable of being formed, the pattern is replaced with the most appropriate seed pattern (step 1502). In this way, it is possible to obtain a semiconductor device composed of only the dummy pattern for the diffusion layer, the dummy pattern for gate conductor and the dummy pattern for the wiring layer which are optimized so that they can be overlapped with the target area ratio (step 1600).

In this case, the block is not one entire chip but a frame having a window of a certain size, and the area ratio is calculated in this frame. In this way, in the space area in the window in which a pattern of a high area ratio exists in the original layout, it is possible to arrange a dummy pattern of a high area ratio. Therefore, this method is very effective for flattening the entire chip.

In this way, a semiconductor device is completed which is composed of only the dummy pattern for diffusion region, the dummy pattern for the gate conductor and the dummy pattern for the wiring which are optimized being overlapped with the target area ratio that has been set according to the most appropriate area ratio.

After that, the layout pattern of the semiconductor device, which is obtained in the above step 1600 and composed of only the dummy pattern for diffusion region, the dummy pattern for the gate conductor and the dummy pattern for the wiring which are optimized, is synthesized with the layout pattern extracted from the layout data (201) of the semiconductor chip for each layer (step 1606). When the layout data of the semiconductor device having no dummy patterns is synthesized as described above, a semiconductor device is completed in which the dummy patterns are existing in the regions in which the transistor and the wiring have not been arranged yet.

After that, from the process condition, the most appropriate area ratio of the gate conductor, the diffusion layer and the wiring as one chip is calculated (S1901).

Figure 9:
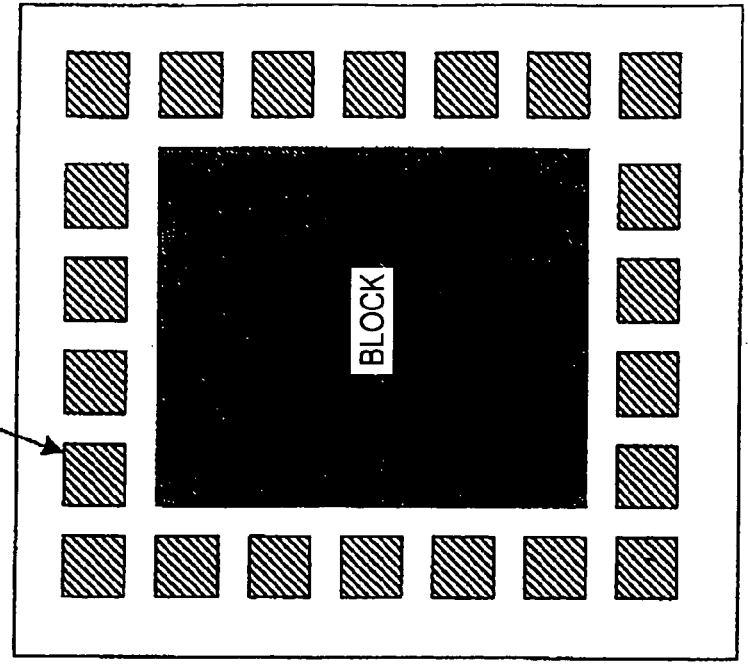
FIG. 9 is a schematic illustration showing a pattern generating process of the first embodiment of the present invention.
Figure 9:
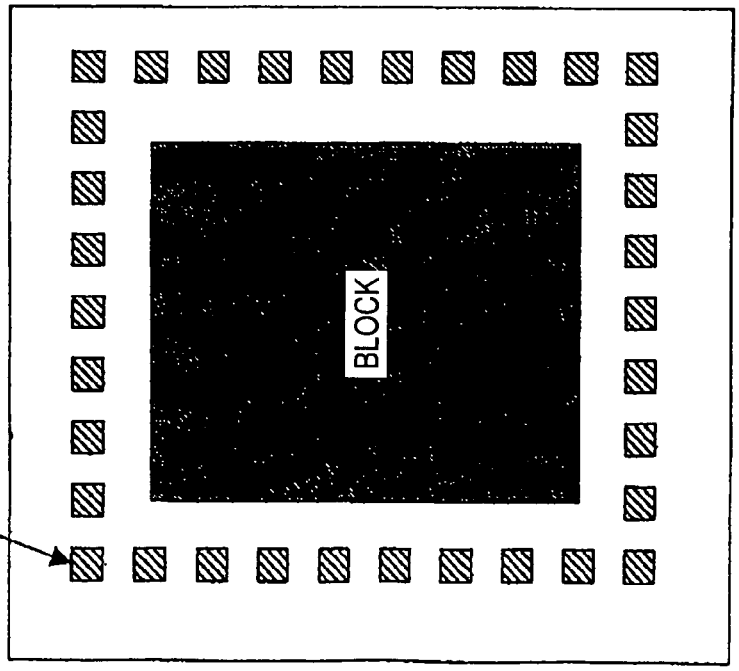

Then, the area ratio as one chip is calculated again. When the area ratio is too low or too high, the dummy pattern cell is appropriately replaced by the dummy pattern cell selected from the graphic pattern 2000 used for replacement (step S2001). For example, in the case where the area ratio is too low as shown in FIGS. 9(*a*) and 9(*b*), the small dummy pattern cell D1 is changed to the large dummy pattern cell D2.

In this way, the dummy pattern, the area ratio of which has been adjusted to be the most appropriate one as one chip, can be generated (step 2002).

In this step 2001 in which the cell is replaced, a position at which the dummy pattern is uniformly arranged can be previously specified. Therefore, replacement can be made. In the case where the area ratio is too low, the dummy pattern in the region arranged uniformly is uniformly changed into a dummy pattern, the area ratio of which is high, so that a dummy pattern, the area ratio of which is adjusted to a desired value, can be generated. On the other hand, in the case where the area ratio is too high, the dummy pattern in the region arranged uniformly is uniformly changed into a dummy pattern, the area ratio of which is low, so that a dummy pattern, the area ratio of which is adjusted to a desired value, can be generated.

As described above, it is possible to obtain a semiconductor device, the pattern accuracy of which is high. For example, in the case of forming a wiring pattern, according to the layout pattern of the wiring obtained in the above step, etching is conducted while a mask pattern formed by photolithography is used as a mask. In this way, the wiring pattern is formed.

In the etching process, a conductive film exposed from the mask pattern is selectively removed. Since the density (area ratio) of the mask pattern and peripheral length of the mask pattern are adjusted so that the optimized area ratio can be attained while concentration is being given to various conditions such as a concentration and temperature of the etchant, it is possible to form a wiring patter, the etching accuracy of which is high.

Concerning the forming of a diffusion layer, a dummy pattern is added so that the most appropriate area ratio can be attained according to the diffusing condition. Therefore, it is possible to prevent a portion, in which no diffusion region is provided, from being continuously formed. That is, it is possible to prevent a large isolation region from being formed. Therefore, the forming of a step generated by isolation can be suppressed.

In CMP process, a surface of the substrate is flattened as follows. In order to flatten the surface of the substrate, an insulating film is formed on the surface by the coating method or the method of CVD, and then the surface is chemically etched while being mechanically polished. In this process, the density of the pattern of the wiring layer used as the front-end of CMP is, for example, not less than 65%. Accordingly, there is no possibility that a region in which no wiring pattern is provided is recessed and left in the recessed state.

As described above, when the layout pattern is biased, it is impossible for the layer concerned to obtain sufficiently high accuracy. Therefore, the pattern accuracy of the upper layer of the layer concerned is affected, and it is impossible to obtain sufficiently high process accuracy. However, when the above step in which the area ratio is adjusted is executed, the process accuracy can be enhanced.

As described above, it is possible to obtain a highly accurate pattern.

Figure 4:
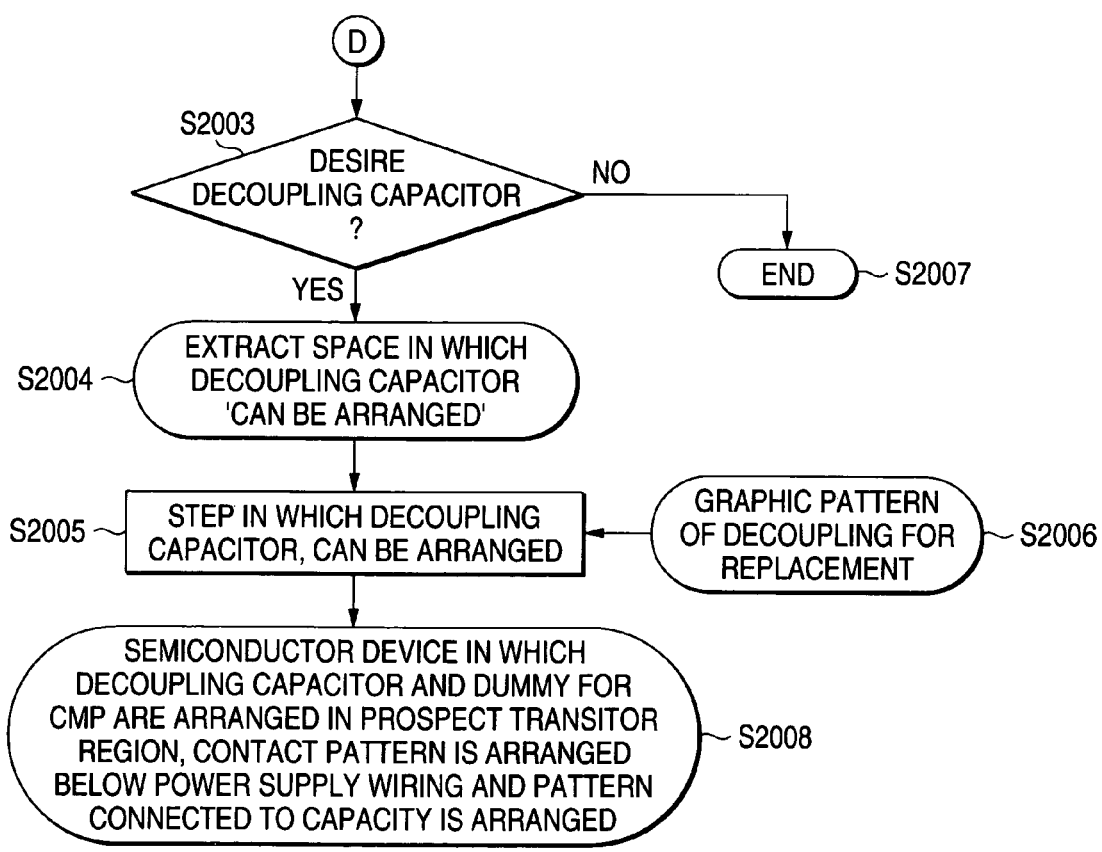
FIG. 4 is a flow chart showing a pattern generating method of the first embodiment of the present invention.

In the case where the decoupling capacitor must be further increased so as to take measures to electromagnetic interference, the decoupling capacitor is added as shown in FIG. 4.

Figure 10:
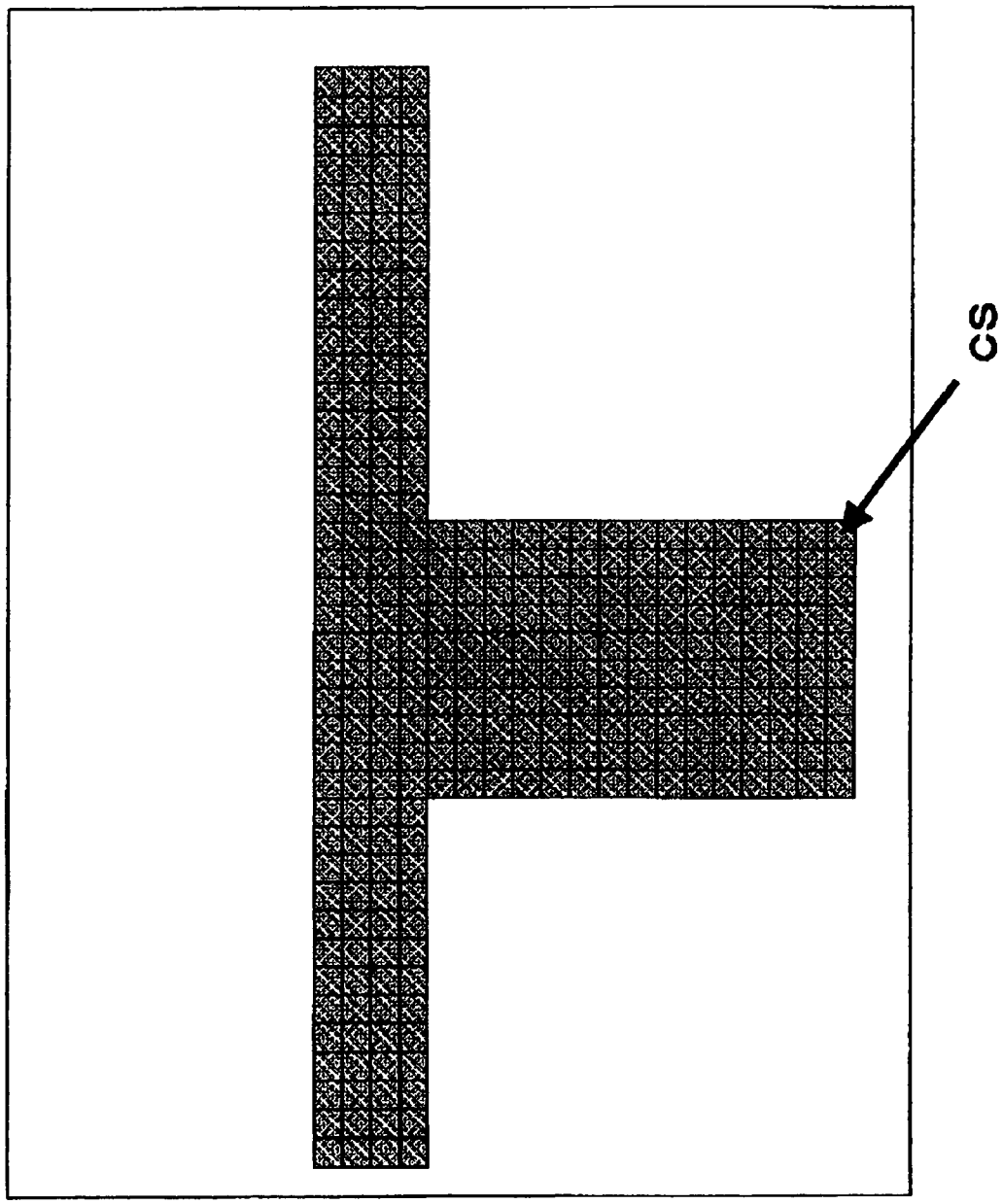
FIG. 10 is a schematic illustration showing a pattern generating process of the first embodiment of the present invention.

First, with respect to the layout pattern of the semiconductor device, the area ratio of which has been optimized by adding the dummy pattern obtained in step 2002, it is judged whether or not an addition of the decoupling pattern is desired (step 2003). When an addition of the decoupling pattern is desired, a space in which the decoupling capacitor can be arranged is extracted (step 2004). In this case, it is judged whether or not the diffusion region pattern and the gate conductor pattern are existing being overlapped with each other in the vertical direction, and as shown in FIG. 10, the space CS in which the decoupling capacitor can be formed is extracted. In this embodiment, when the pattern of each layer is arranged, positioning is conducted while a left lower portion and a right upper portion of the chip are being checked. Therefore, when the dummy pattern of each layer is arranged at the same pitch and the area ratio is adjusted while the pitch is being adjusted in such a manner that all the dummy patterns are used, every two dummy patterns is used or every three patterns is used, it is possible for the patterns to be automatically stacked on each other in the vertical direction.

Figure 11:
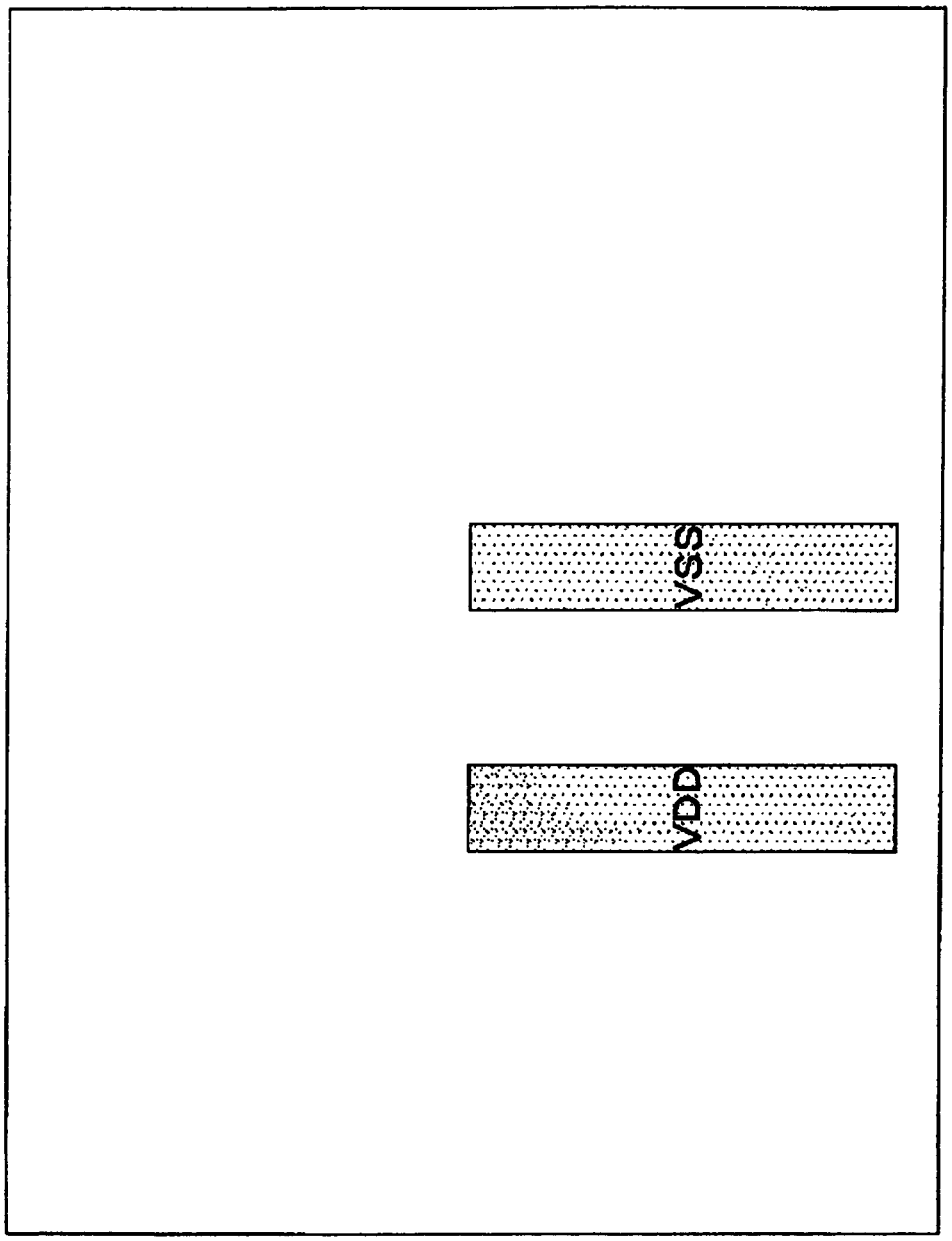
FIG. 11 is a schematic illustration showing a pattern generating process of the first embodiment of the present invention.
Figure 12:
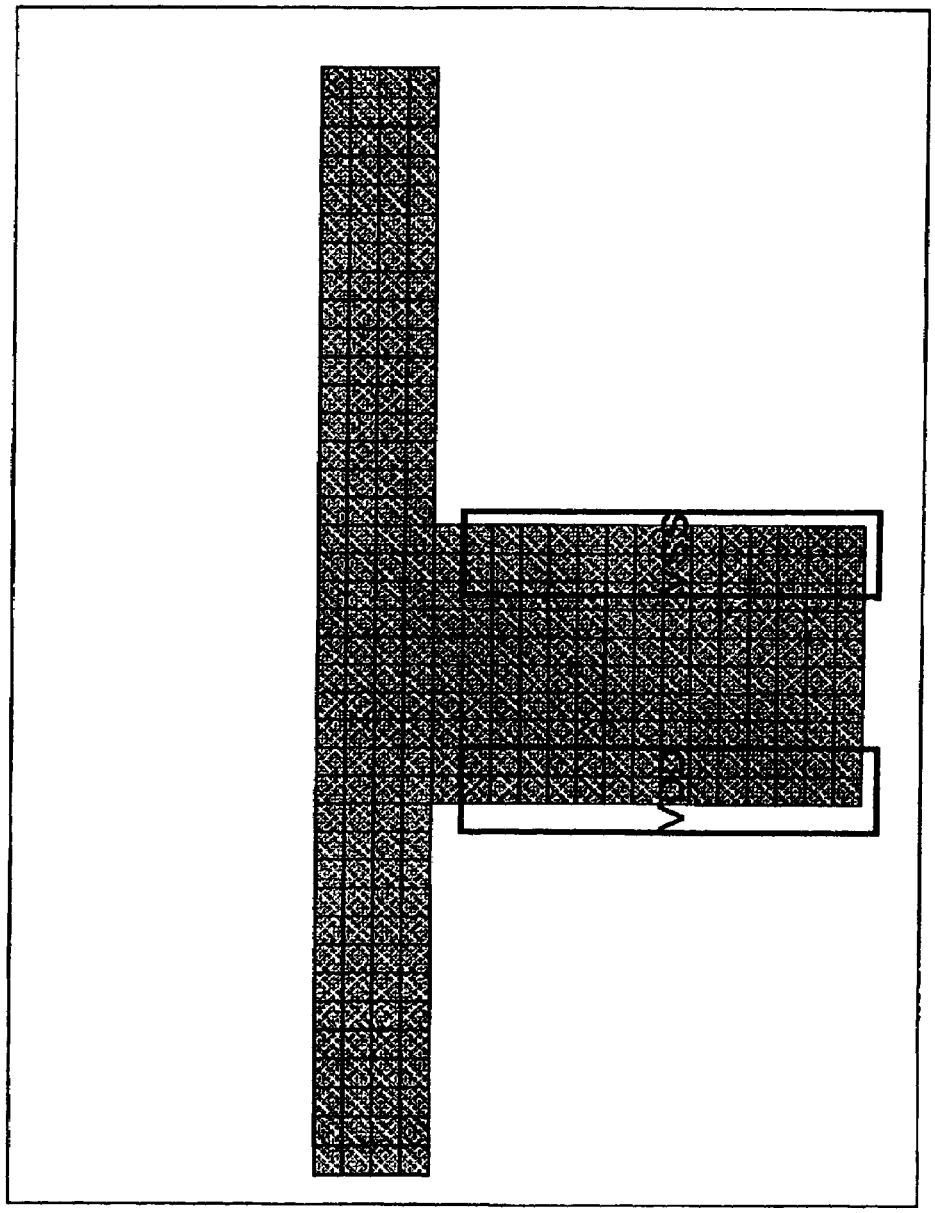
FIG. 12 is a schematic illustration showing a pattern generating process of the first embodiment of the present invention.

Accordingly, the decoupling capacitor is replaced by using the decoupling graphic pattern 2006 used for replacement (step 2005). Further, as shown in FIG. 11, the power supply wiring VDD and the ground wiring VSS are added, and a layout pattern of the semiconductor device, in which the area ratio is adjusted and the decoupling capacitor is added, is generated as shown in FIG. 12 (step 2008). In this case, when either the diffusion region pattern or the gate conductor pattern is adjusted, the decoupling capacitor can be added.

In this way, the most appropriate data of the semiconductor device can be obtained.

Concerning the connection of the power supply wiring and the ground wiring with the decoupling capacitor cell, in the case where it is impossible to conduct a direct connection, as shown below, when the dummy wiring cell is used, the connection can be easily accomplished.

Figure 13:
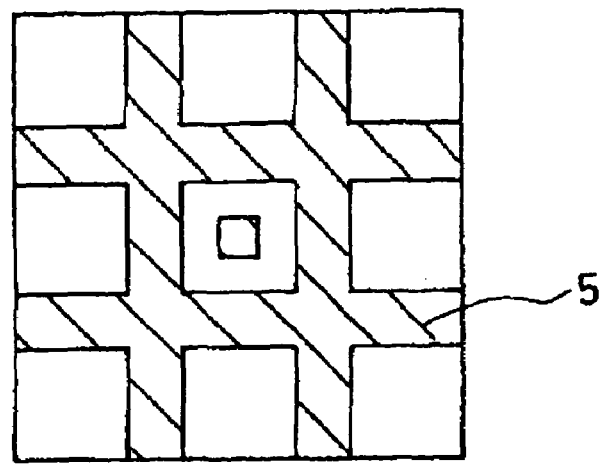
FIG. 13 is a view showing the third embodiment of the present invention.
Figure 13:
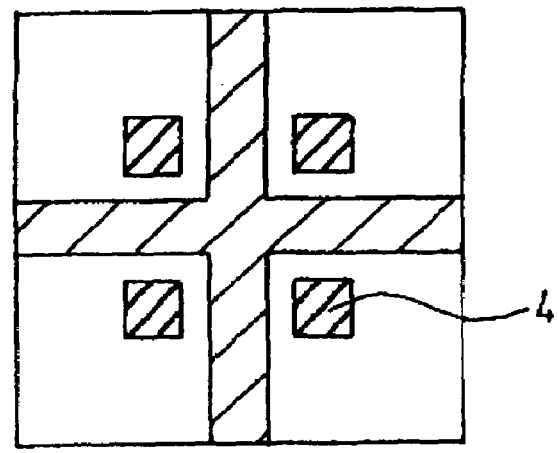
Figure 13:
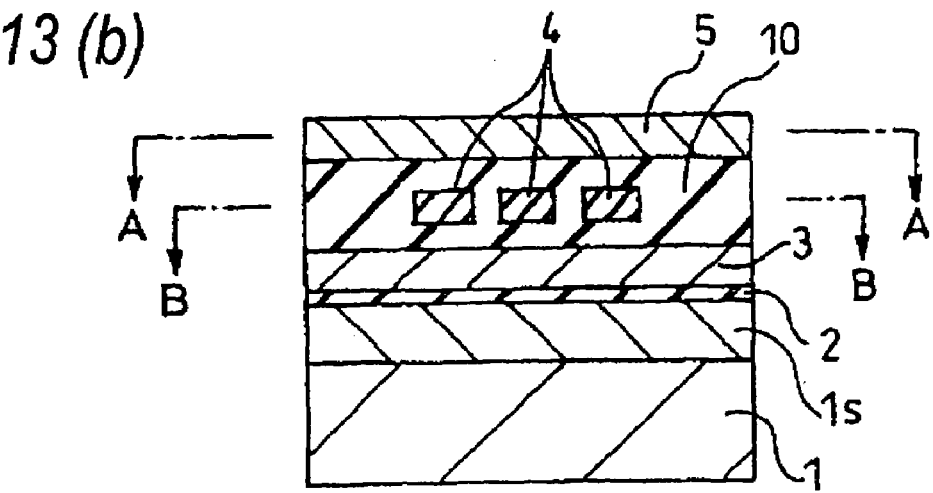

As shown in FIGS. 13(*a*) to 13(*c*), this graphic pattern for connecting the electric power supply is a dummy pattern cell formed on the MOS capacitor cell formed in such a manner that the diffusion region 1S, which is formed on the semiconductor substrate 1, and the gate electrode 3 interpose the gate oxide film 2 as an insulating film. This dummy pattern cell has a cross like pattern. A dummy pattern cell of the upper layer or the lower layer of the cross like pattern composed so that an isolated island-shaped pattern can be formed in a region corresponding to the cross region of the cross like pattern.

This dummy pattern cell includes: a first layer cell 4 having a cross like pattern and four isolated island-shaped patterns divided into the four regions by the cross like pattern as shown in FIG. 13(*b*); and a second layer cell 5, which is located on the upper layer or the lower layer continuing to the first layer cell 4, composed of a sharp-mark-shaped pattern which is arranged so that it can cross at four points corresponding to the four island-shaped patterns as shown in FIG. 13(*c*). In this structure, the first layer and the second layer respectively compose the electric power supply wiring and the ground wiring. In this case, FIG. 13(*a*) is a sectional view taken on line A—A in FIG. 13(*c*), and FIG. 13(*b*) is a sectional view taken on line B—B in FIG. 13(*c*). Reference numeral 10 is an insulating film formed between layers.

As described above, in order to connect the MOS capacitor cell to a desired electric potential such as a power supply electric potential or a ground electric potential, the wiring length is reduced so that the connection can be easily accomplished. Since it is possible to connect or not to connect keeping it in a floating condition, the connecting state can be easily controlled by whether or not through-holes are formed on the isolated pattern. When the through-holes are formed so that they can penetrate the isolated pattern, the connection with the electric power supply can be accomplished on the upper layer side or the lower layer side jumping one layer.

The decoupling capacitor, which has been spread all over right below the electric power supply, can be easily connected to the power supply electric potential when vias are provided right above the decoupling capacitor. In this case, it an upper portion of the MOS capacitor cell is open, that is, if signal lines are not formed in an upper portion of the MOS capacitor cell, vias and pads for stacking are automatically formed.

As described above, even when it is distant from the electric power supply wiring, it is possible to increase the decoupling capacitor. When the wiring is formed into a cross-shape at the same pitch as that of the MOS capacitor cells, the connection can be easily accomplished.

Second Embodiment

Next, explanations will be made into the second embodiment of the present invention, which is another embodiment in which the area ratio is optimized.

Figure 17:
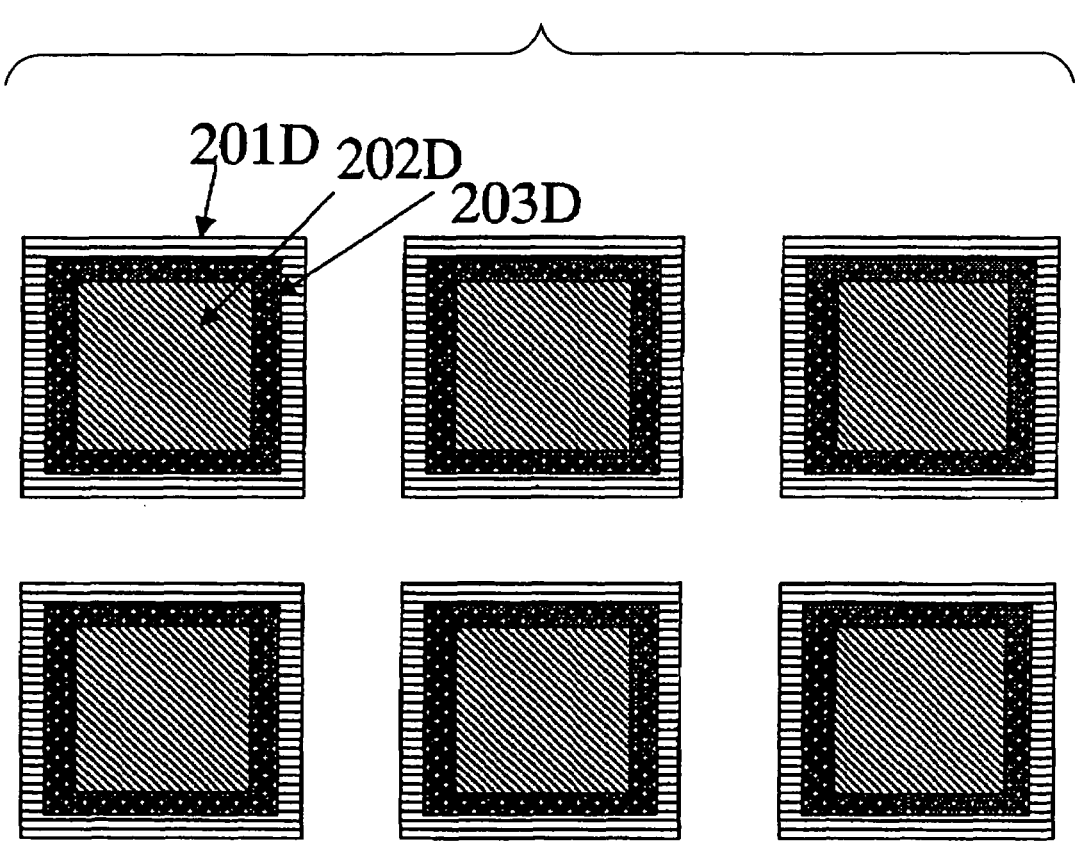
FIG. 17 is a schematic illustration showing a pattern generating process of the second embodiment of the present invention.
Figure 18:
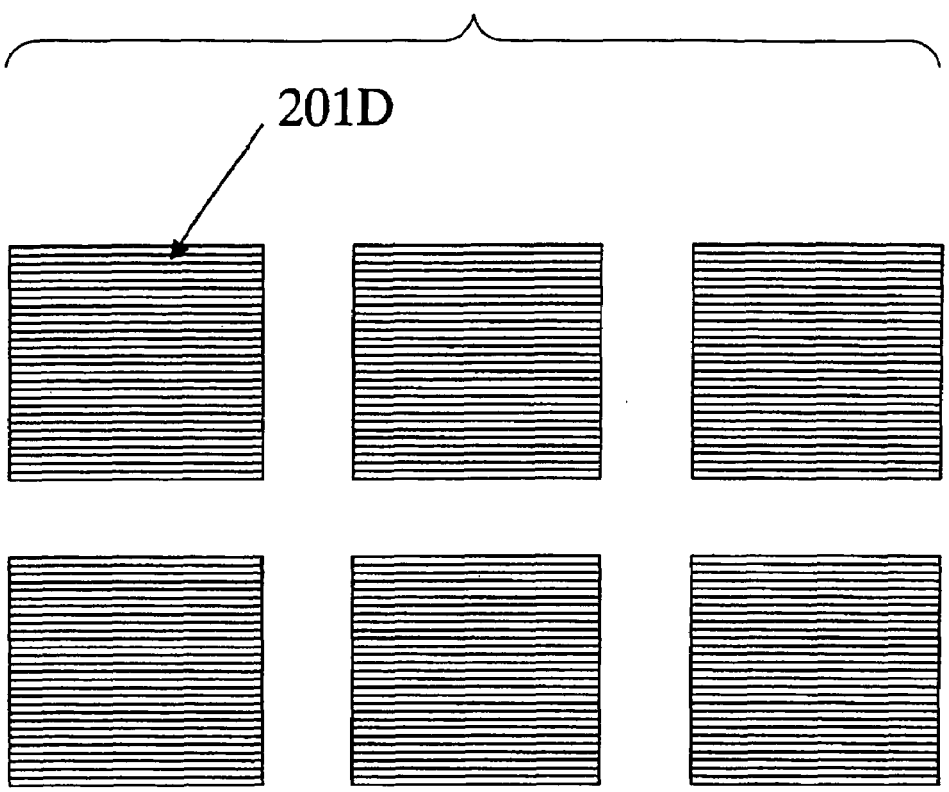
FIG. 18 is a schematic illustration showing a pattern generating process of the second embodiment of the present invention.
Figure 19:
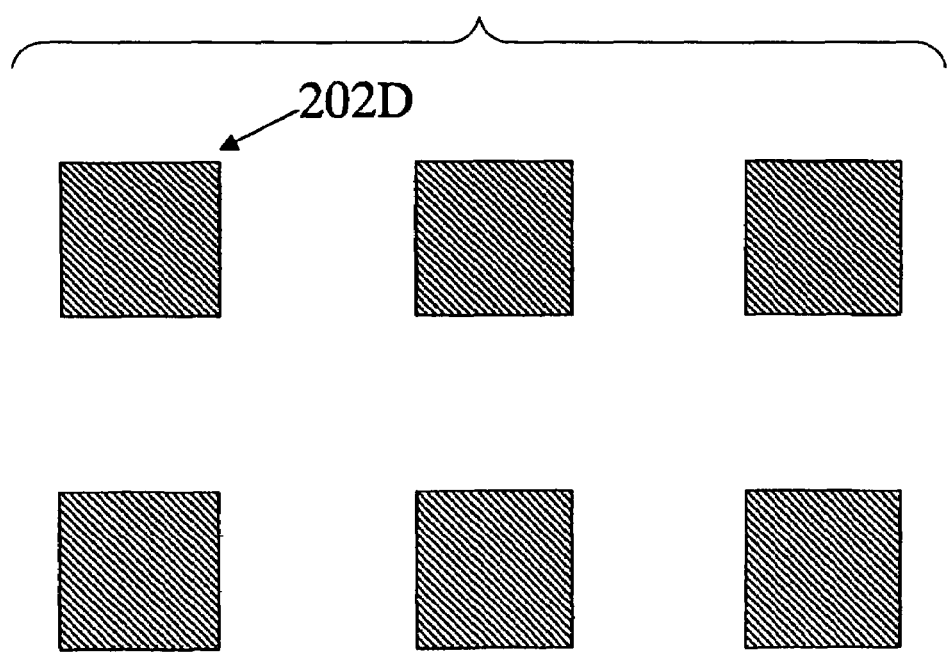
FIG. 19 is a schematic illustration showing a pattern generating process of the second embodiment of the present invention.
Figure 20:
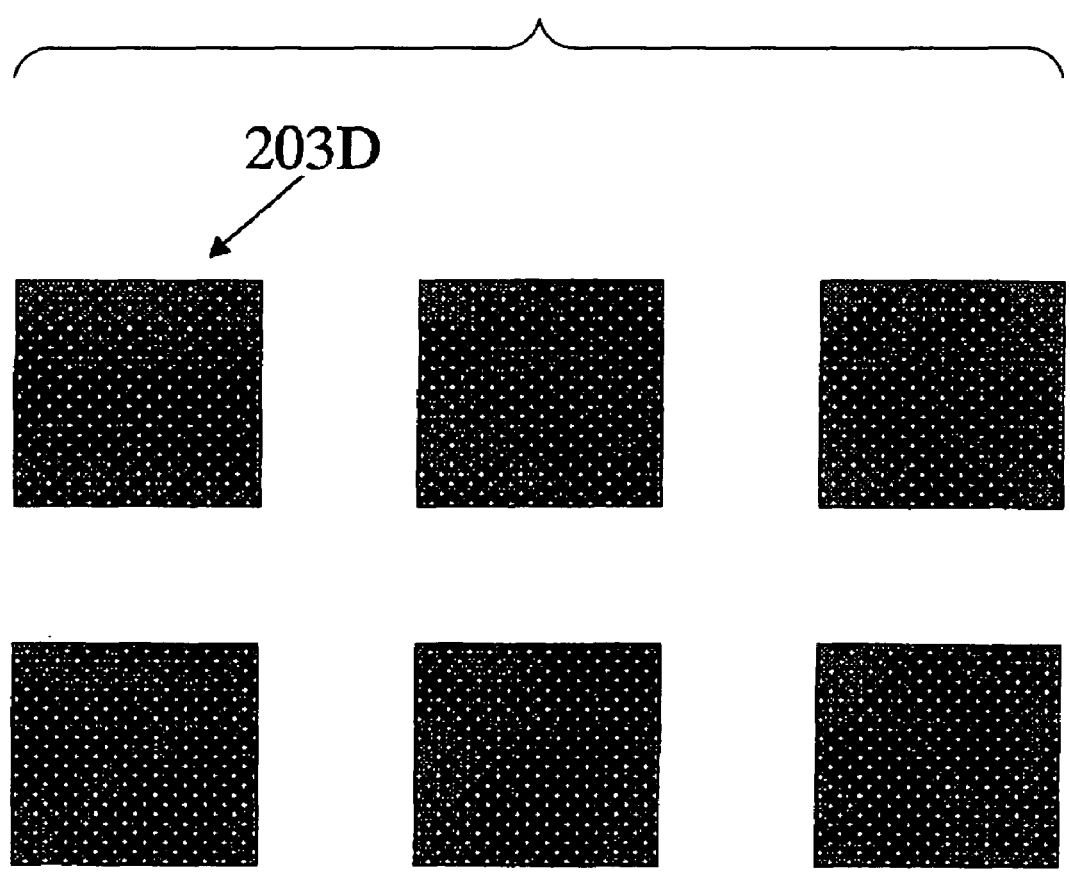
FIG. 20 is a schematic illustration showing a pattern generating process of the second embodiment of the present invention.
Figure 21:
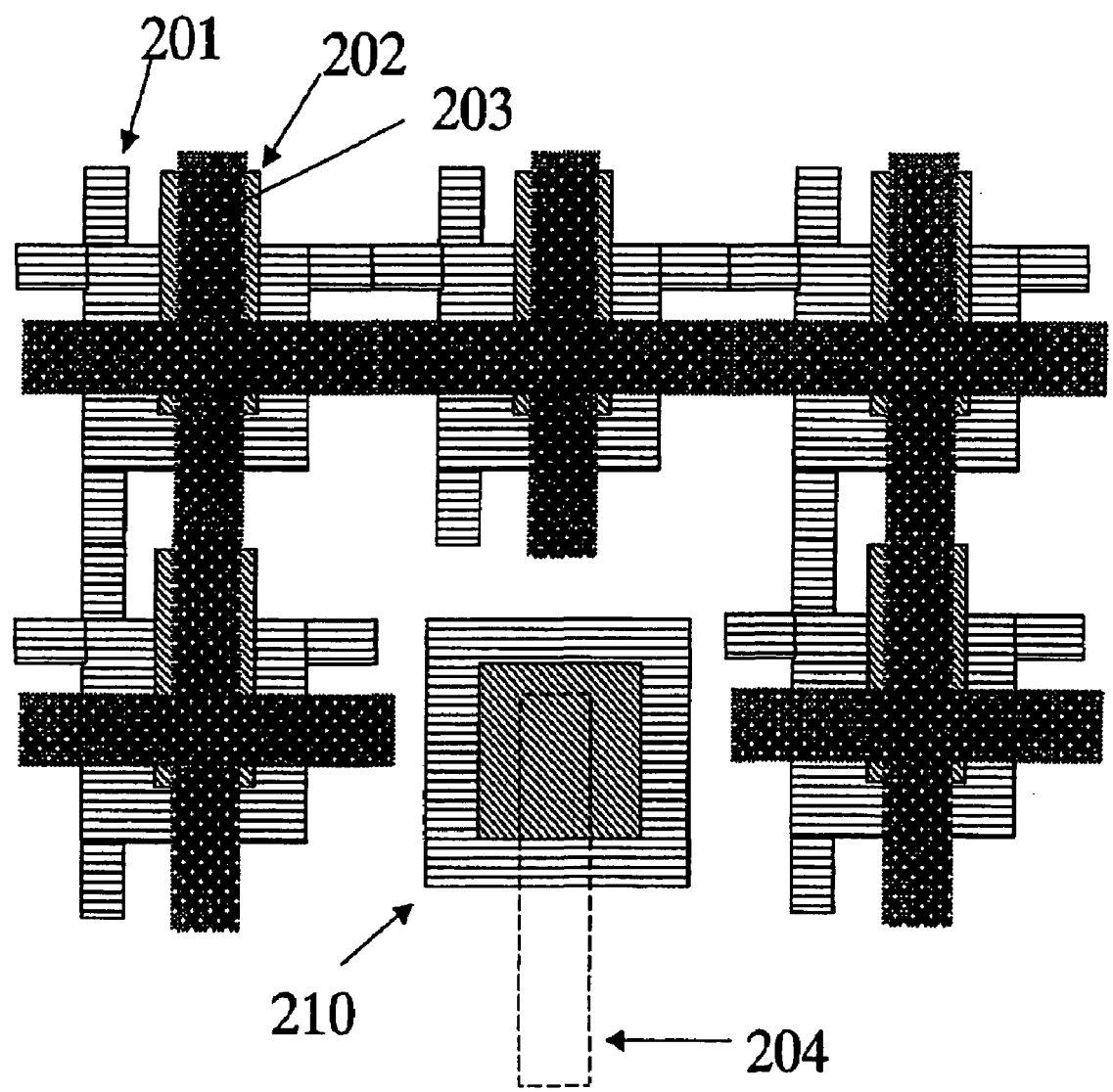
FIG. 21 is a schematic illustration showing a pattern generating process of the second embodiment of the present invention.
Figure 22:
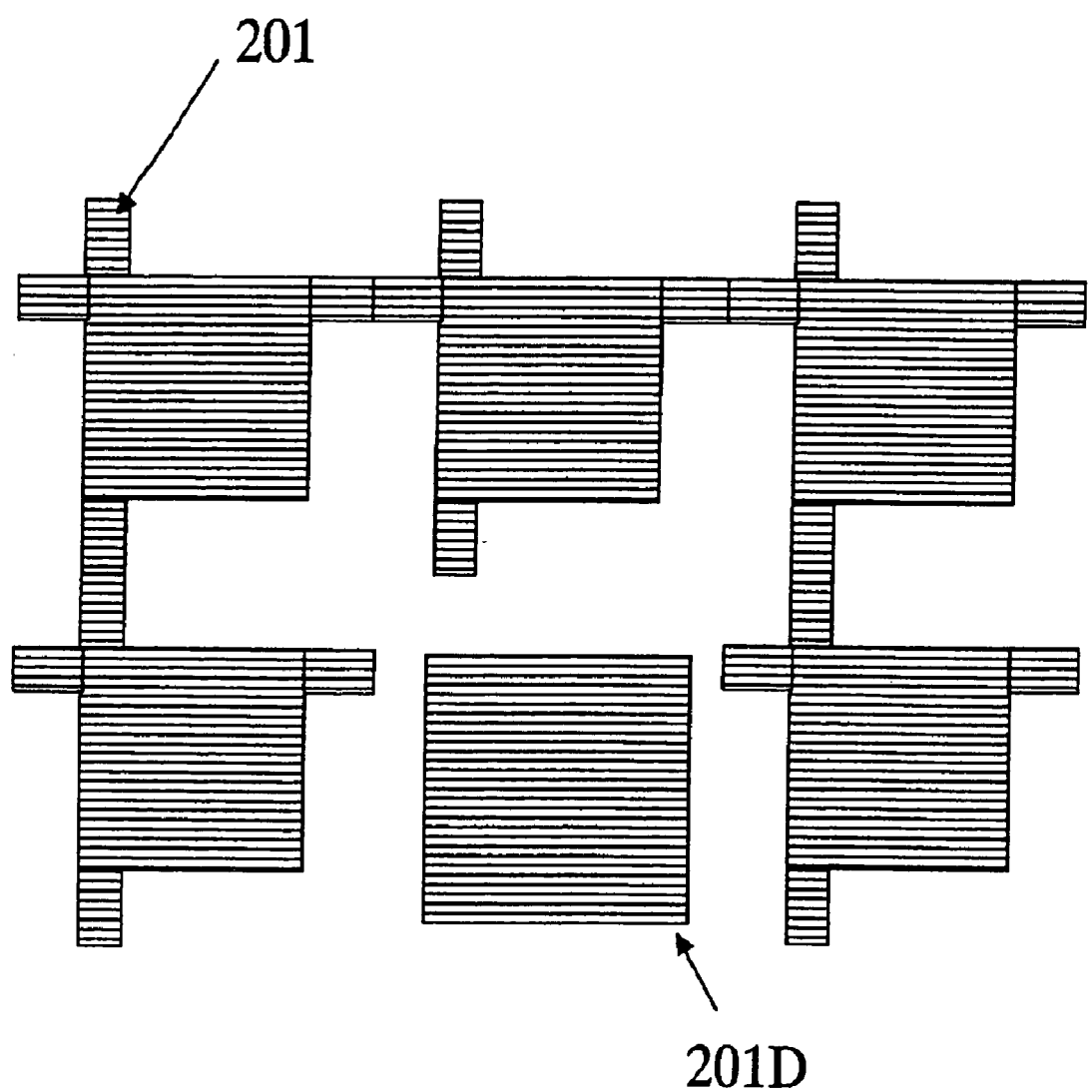
FIG. 22 is a schematic illustration showing a pattern generating process of the second embodiment of the present invention.
Figure 23:
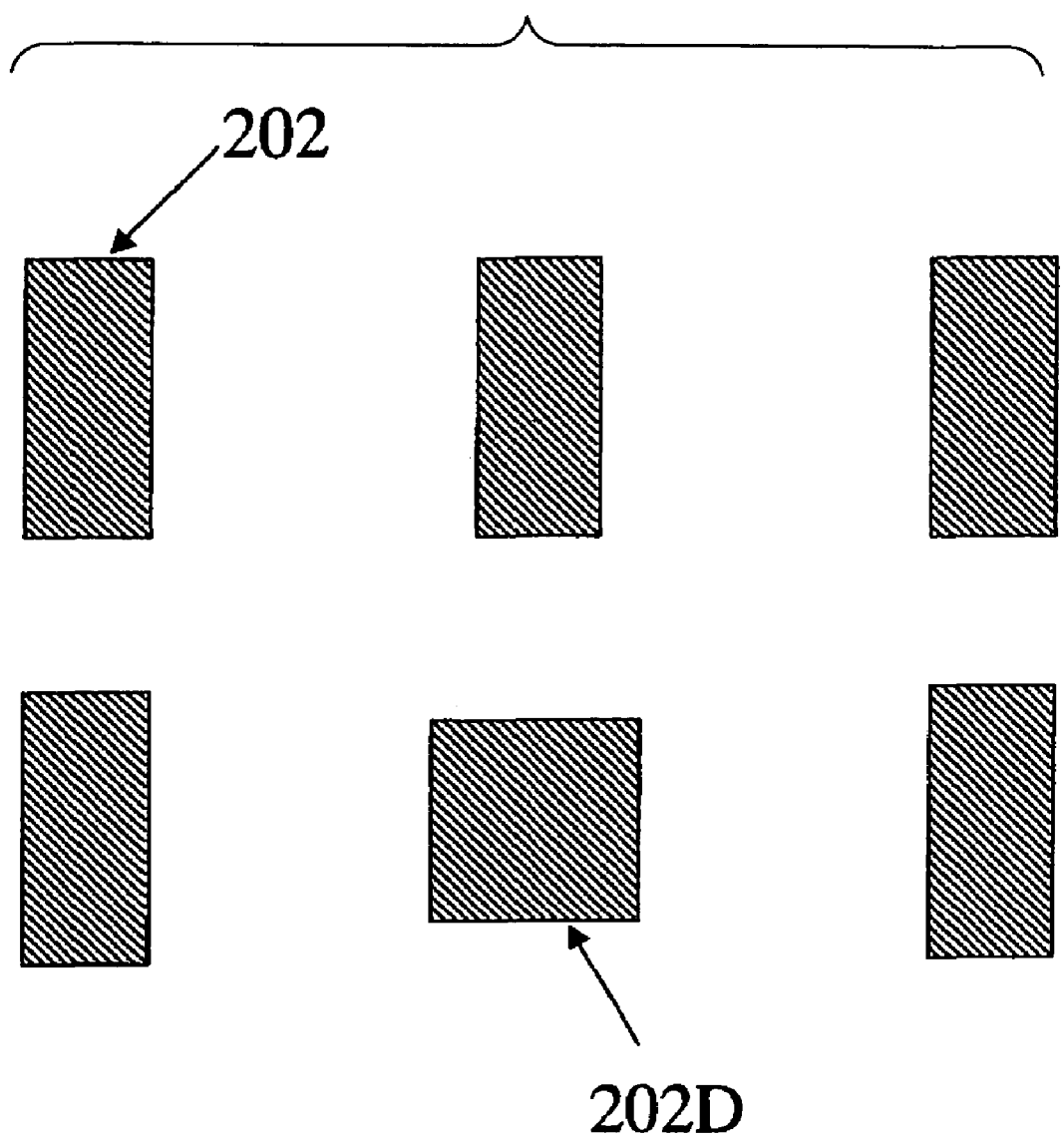
FIG. 23 is a schematic illustration showing a pattern generating process of the second embodiment of the present invention.
Figure 24:
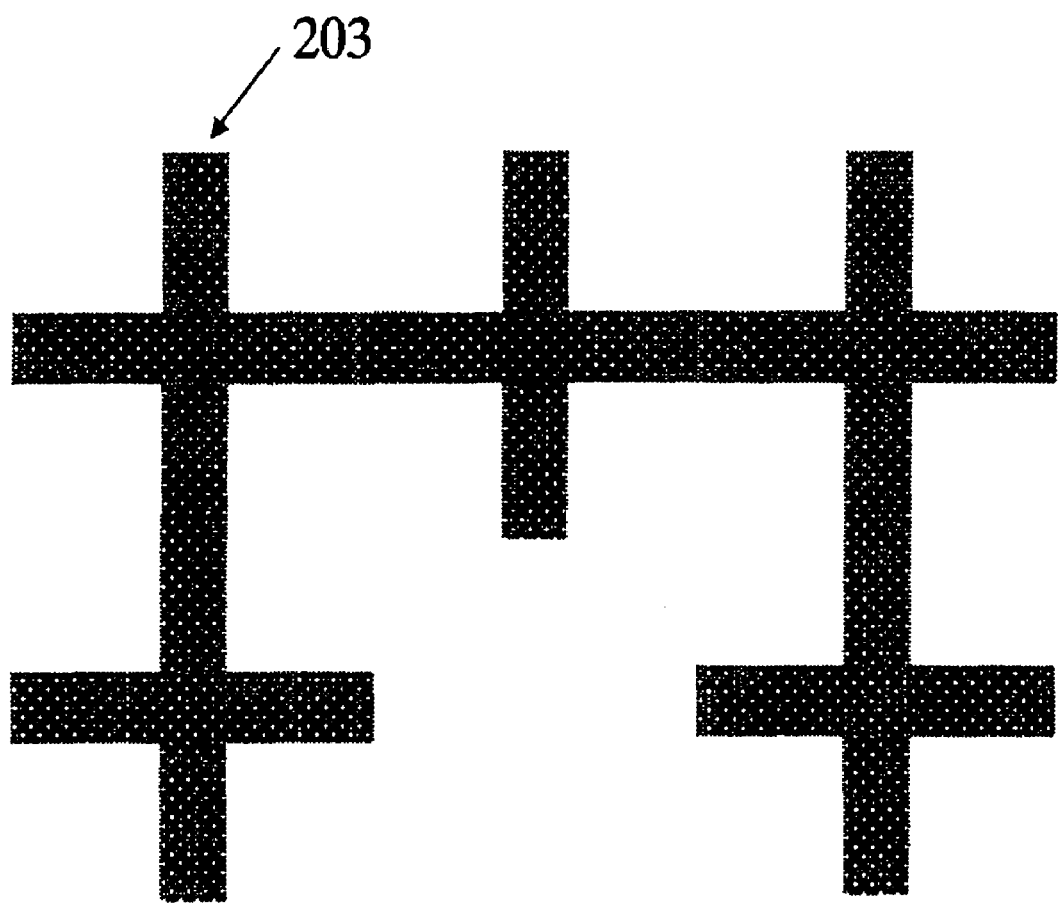
FIG. 24 is a schematic illustration showing a pattern generating process of the second embodiment of the present invention.

The optimizing step explained in step S2002 (shown in FIG. 3) in the first embodiment is executed. As shown in the entire image view of FIG. 17, a dummy pattern including the square dummy dot patterns 201D, 202D, 203D is added to each layer. FIGS. 18 to 20 respectively show the optimized dummy dot patterns 201D, 202D, 203D of the diffusion region, the gate wiring and the wiring layer of FIG. 17. The density of the dummy dot pattern is set according to the most appropriate area ratio of each layer.

As can be understood from this view, the dummy dot patterns of the layers are put on each other in the vertical direction because the dummy dot patterns are positioned at a right upper position and a left lower position of the chip.

After that, in step S2003 (shown in FIG. 4), it is judged whether or not the decoupling capacitor is necessary. When it is judged that the decoupling capacitor is necessary, the decoupling capacitor is replaced in step 2005. As shown in FIGS. 21 to 24, the patterns are replaced with the diffusion region dummy pattern 201, the gate dummy pattern 202 and the wiring gate pattern 203 so that each dummy pattern cell can be connected to them for each layer. However, the signal lines are extracted while including the upper and the lower layer, and a region having the signal line is made to be a region in which it is not allowed to form the decoupling capacitor, and the dummy pattern is returned to the original dot patterns 201D, 202D, 203D. In this way, the decoupling capacitor can be excellently added.

In this case, when it is designed that the area ratios of the diffusion region dummy pattern 201, the gate dummy pattern 202 and the wiring gate pattern 203 are made to be the same as the area ratios of the diffusion region dummy dot pattern 201D, the gate dummy pattern 202D and the wiring gate dot pattern 203D, it is possible to maintain the most appropriate area ratio without causing a change in the area ratio by replacement.

Third Embodiment

Figure 14:
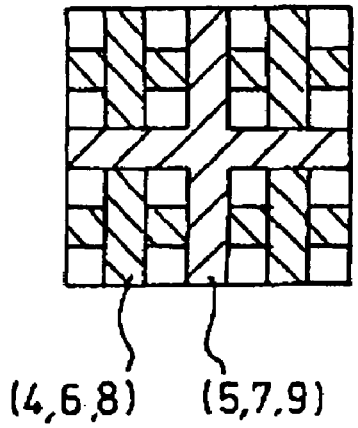
FIG. 14 is a view showing the fourth embodiment of the present invention.
Figure 14:
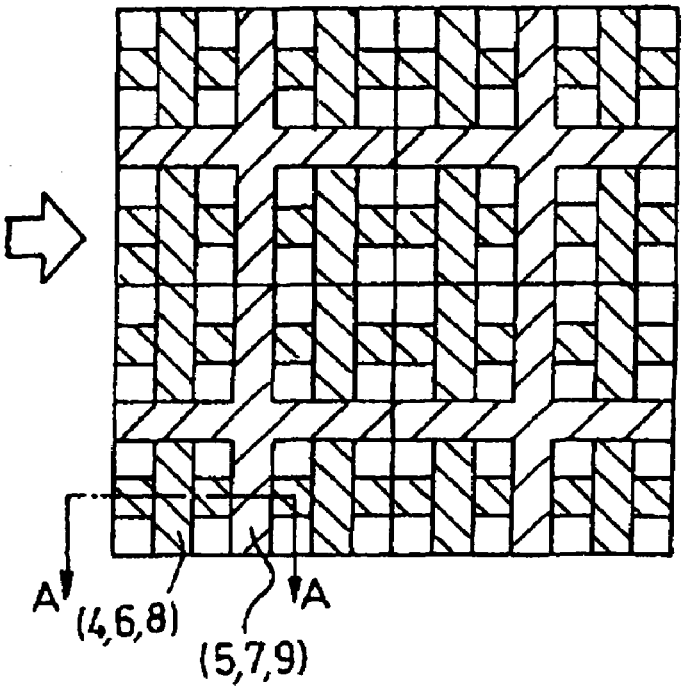
Figure 14:
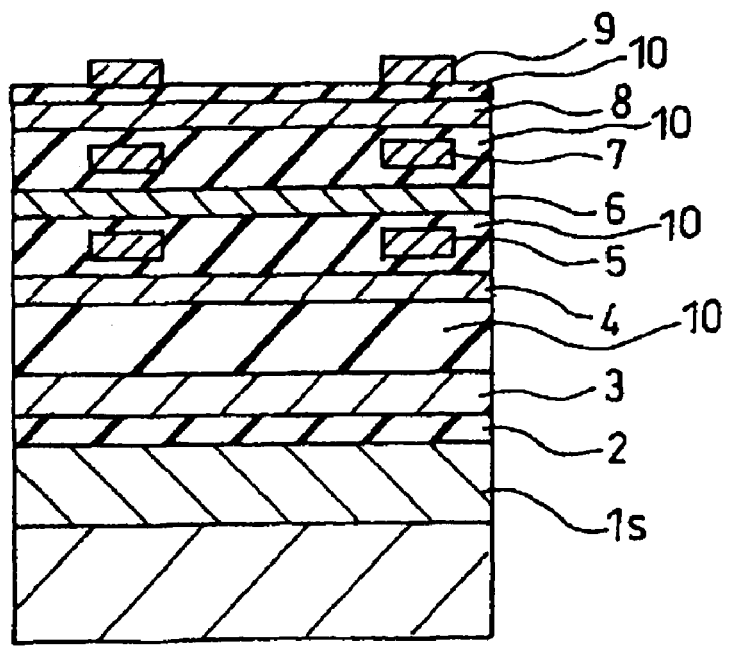

As a variation of the dummy pattern cell used for connection, it is effective to adopt a structure shown in FIGS. 14(*a*) to 14(*c*). Concerning this dummy pattern cell, the unit is shown in FIG. 14(*a*), the connecting body is shown in FIG. 14(*b*), and the sectional view is shown in FIG. 14(*c*). As shown in these drawings, this dummy pattern cell may be formed in such a manner that the first layer cells 4, 6, 8 having a cross-shaped pattern, formed at the same pitch as that of the cells and the second layer cells 5, 7, 9 composed of a sharp-mark-shaped pattern, located on the upper or the lower layer continuing to the first layer cells 4, 6, 8 are shifted from each other.

In this case, FIG. 14(*a*) is a view showing one unit, FIG. 14(*b*) is a view showing the combination, and FIG. 14(*c*) is a sectional view taken on line A—A in FIG. 14(*b*). Reference numeral 10 is an insulating film between the layers.

According to this constitution, concerning the connection to the power supply wiring and the ground wiring, a periphery of the cells which are spread all over may be connected in the lateral direction. When the power supply or the ground wiring is arranged in an upper direction of the cells, the wiring on the upper layer may be connected.

As described above, when the MOS capacitor cell is connected to a desired electric potential such as a power supply electric potential or a ground potential, the length of the wiring can be reduced and the connection can be easily made.

Fourth Embodiment

Figure 15:
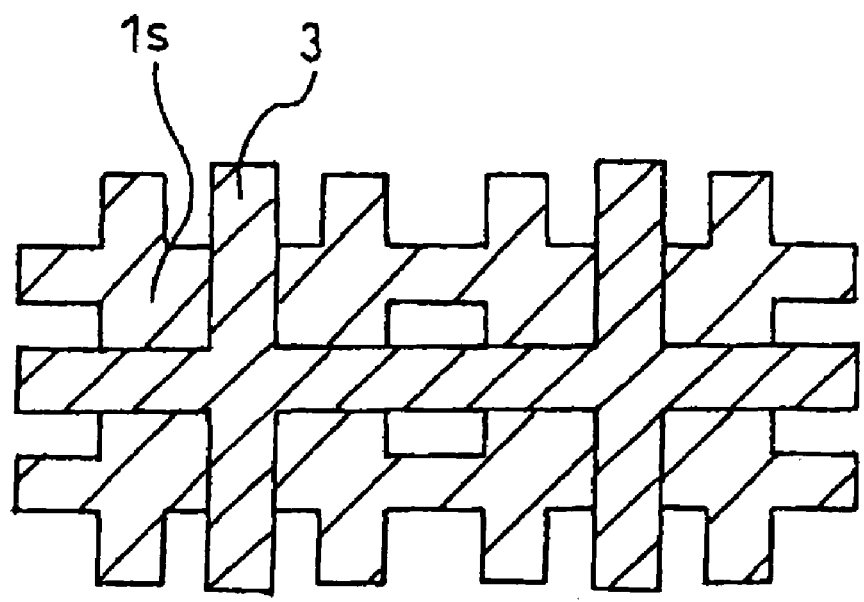
FIG. 15 is a view showing the fifth embodiment of the present invention.

In the case where the wiring can not be utilized when connection is conducted on the power supply wiring and the ground wiring, as shown in FIG. 15, it is possible to adopt a cell shape in which the diffusion layers 1S are connected with each other and the gates 3 are connected with each other under the condition that the cells are arranged.

According to this constitution, even when one portion can be connected to the power supply wiring or the ground wiring, all the cells connected can be utilized as cells.

Fifth Embodiment

Figure 16:
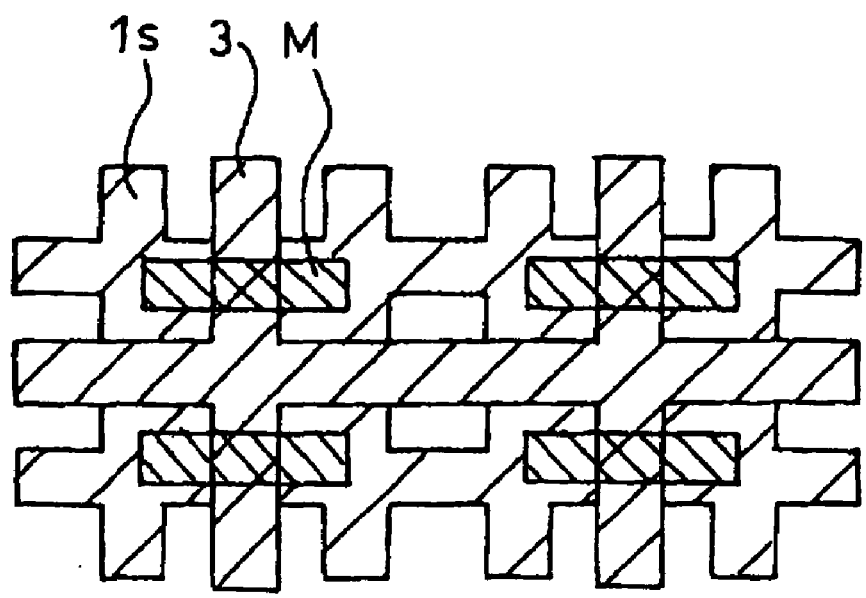
FIG. 16 is a view showing the sixth embodiment of the present invention.

Further, as shown in FIG. 16, the diffusion layers 1S may be connected with each other by the wiring M.

According to this constitution, the connection can be more positively conducted.

(Sixth Embodiment)

According to the method of the present invention, wiring can be automatically arranged and conducted even on LSI having a thick gate oxide film region and a thin gate oxide film region as the MOS capacitor cell. Therefore, wiring can be automatically arranged and conducted when conditions corresponding to the use are added.

For example, in the case of an analog circuit region which must have a high withstanding voltage, it is necessary to increase the film thickness of the gate oxide film. On the other hand, in the case of a logic circuit region, it is unnecessary to increase the film thickness of the gate oxide film. Therefore, it is preferable to adopt a structure in which the film thickness of the gate oxide film is increased in the analog circuit region and the film thickness of the gate oxide film is relatively decreased in the other logic region so that the decoupling capacitor can be increased. However, recently, the semiconductor device has been highly integrated and the function has been highly enhanced. Accordingly, in order to enhance the reliability, there is a tendency that a thick gate oxide film is adopted even in the logic circuit region. For example, the analog circuit region is specified by the withstanding voltage specification 3.3V, and the other logic circuit region is specified by the withstanding voltage specification 1.5V. On the other hand, in these days, the other logic circuit region is specified by the withstanding voltage specification 3.3V in some cases. In this case, when the decoupling capacitor is going to be increased so as to take measures to electromagnetic interference in the logic circuit region, it is possible to add the decoupling capacitor to the maximum.

As described above, according to the present invention, it is possible to extract the space area and form the decoupling capacitor at the maximum. Therefore, it is possible to satisfy a relation of trade-off in which one is a reduction of the gate leakage and the other is an increase in the decoupling capacitor. That is, while the gate leakage is being reduced, the decoupling capacitor can be increased.

As described above, it is possible to provide a semiconductor device having a function of reducing magnetic interference noise generated by high frequency operation.

When consideration is given to the specification and the circumstances of a region are judged from the design rule, it is possible to provide a bypass capacitor, the characteristic of which is different, for each region. For example, in the outer circumferential portion of the chip close to the electric power supply wiring, in order to take measures to the occurrence of a surge, it is necessary that a withstanding voltage is high. On the other hand, inside the chip, it is unnecessary that a withstanding voltage is high. Therefore, the gate oxide film is thick in the periphery of the outer circumference of the chip, and the gate oxide film is thin inside the chip.

Further, it is possible to adopt a method in which a gate oxide film of the multiple layer structure is provided only in the periphery of the outer circumference of the chip.

The frequency characteristic is important in the periphery of the functional element. Therefore, in the case of using high frequency, it is necessary to provide a bypass capacitor of a large capacitor. On the other hand, in the case of using low frequency, it is sufficient to provide a bypass capacitor of a small capacitor. In this way, the capacitor of the bypass capacitor may be appropriately selected according to the frequency band to be used.

In this connection, both P channel capacitor cell and N channel capacitor cell are prepared, and when it is impossible to supply electric power to the P channel capacitor cell, the N channel capacitor cell may be rearranged so that it can be used.

When a capacitor cell having both capacities of P channel and N channel is prepared so that both capacities of P channel and N channel are arranged, the capacitor can be arranged without being biased. Therefore, the uniformity can be ensured and the concentration of ions can be prevented, and a desired diffusion profile can be obtained.

As explained above, in a semiconductor device of the present invention, a dummy pattern is formed so that an area ratio can be the most appropriate according to a process condition. Therefore, it is possible to provide a highly reliable semiconductor device, the accuracy of which is high.

In the case of generating a pattern, after a layout pattern of a chip has been generated, a space area, in which no layers are existing at all, is automatically searched by utilizing a graphic logic calculation and resizing, and a dummy pattern is added to the thus searched area so that the area ratio can be the most appropriate, that is, the pattern can be automatically generated. When a decoupling capacitor is generated in relation with this space area in the vertical direction, it becomes possible to reduce the generation of noise with high accuracy.

What is claimed is:

1. A method of generating a pattern for a semiconductor device comprising:
   a step of designing and arranging a layout pattern of a semiconductor chip;
   a step of extracting an area ratio of the layout pattern;
   a step of determining a most appropriate area ratio of the layout patter of a layer according to a design rule of the layer; and
   a step of adding and arranging a dummy pattern to the layout pattern so that the area ratio of the layer can be the most appropriate area ratio,
   wherein the most appropriate area ratio is in a range between upper and lower values.

2. A method of generating a pattern for a semiconductor device according to claim 1, further comprising:
   a step of dividing the layout pattern formed in the layout pattern forming step into small regions of a desired size;
   a step of extracting an area ratio of a mask pattern for each small region divided; and
   a step of adding a dummy pattern so that the area ratio can be overlapped with the most appropriate area ratio of the mask pattern corresponding to the layout pattern,
   wherein the area ratio of each small region is adjusted to be the same.

3. A method of generating a pattern for a semiconductor device according to claim 2, further comprising:
   a step of preparing a plurality of types of dummy pattern cells, the area ratios of which are different from each other,
   wherein the dummy pattern adding step include a step of selecting a desired dummy pattern cell from the dummy pattern cells according to the area ratio of the small region.

4. A method of generating a pattern for a semiconductor device according to claim 1,
   wherein an area ratio after the completion of forming the dummy pattern is calculated, it is judged whether or not the area ratio is in a range of a predetermined condition, and when the area ratio is not in the range of the predetermined condition, several of the dummy patterns are replaced and the most appropriate dummy pattern cell is selected.

5. A method of generating a pattern for a semiconductor device according to claim 1, wherein the layout pattern forming step includes a step of forming a mask pattern for forming a wiring layer.

6. A method of generating a pattern for a semiconductor device according to claim 1, wherein the layout pattern forming step includes a step of forming a mask pattern for forming a diffusion layer.

7. A method of generating a pattern for a semiconductor device according to claim 1, wherein the layout pattern forming step includes a step of forming a mask pattern for forming a gate electrode.

8. A method of generating a pattern for a semiconductor device according to claim 1, wherein the layout pattern forming step includes a step of forming a mask pattern for forming a well.

9. A method of generating a pattern for a semiconductor device according to claim 1, further comprising a step of adjusting a layout in the vertical direction so that the dummy pattern cell can compose an MOS capacitor cell.

10. A method of generating a pattern for a semiconductor device according to claim 9, wherein the MOS capacitor cell is electrically connected to a power supply wiring and a ground wiring by a dummy pattern cell composed of an aggregation of the dummy patterns.

11. A method of generating a pattern for a semiconductor device according to claim 10, wherein the dummy pattern cell has a cross like pattern, and the dummy pattern cells on an upper and a lower layer of the cross like pattern mutually have an island-shaped isolated pattern corresponding to the cross region of the cross like pattern.

12. A method of generating a pattern for a semiconductor device according to claim 11, wherein the dummy pattern cell is composed of a first layer cell having a cross like pattern and an isolated island-shaped pattern in each of the four regions divided by the cross like pattern and also composed of a second layer cell, the pattern of which is a sharp-mark-shape arranged so that it crosses at four points corresponding to the four island-shaped pattern, located on an upper layer or a lower layer continuing to the first layer cell, and the first layer and the second layer respectively compose an electric power supply wiring and a ground wiring.

13. A device of generating a pattern used for a semiconductor device comprising:
a layout pattern forming means for forming a layout pattern from layout data of a semiconductor chip;
a space area detecting means for detecting a space area according to the layout pattern with respect to at least one layer of the layout pattern;
a most appropriate area ratio extracting means for extracting the most appropriate area ratio for forming the pattern of the layer, said appropriate area ratio being determined according to a design rule of the layer; and
a dummy pattern arranging means for calculating an area ratio of the layer from the space area detecting means and arranging a dummy pattern so that the area ratio can be the most appropriate area ratio,
wherein the most appropriate area ratio is in a range between upper and lower values.

14. A method of manufacturing a semiconductor device comprising:
a step of forming a mask pattern of each step according to a pattern for a semiconductor device generated by the method described in claim 1 and
a step of executing each process by using the mask pattern and forming a semiconductor device.

15. A semiconductor device comprising a pattern for a semiconductor device generated by the method described in claim 1.

16. A semiconductor device according to claim 15, wherein the pattern for a semiconductor device has an aggregation of dummy patterns of the same size not to be electrically connected, and at least one of the dummy patterns on each layer includes a region overlapped with a dummy pattern on an upper or a lower layer of the layer concerned in the vertical direction.

17. A method of manufacturing a semiconductor device comprising:
a step of forming a mask pattern of each step according to a pattern for a semiconductor device generated by the device described in claim 13;
and a step of executing each process by using the mask pattern and forming a semiconductor device.

18. A semiconductor device comprising a pattern for a semiconductor device generated by the device described in claim 13.

* * * * *